United States Patent
Hofmann et al.

(10) Patent No.: US 12,451,996 B2
(45) Date of Patent: Oct. 21, 2025

(54) RLC AM SELECTIVE RETRANSMISSION AND WINDOW MOVEMENT

(71) Applicant: Apple Inc., Cupertino, CA (US)

(72) Inventors: Christian Hofmann, Munich (DE);
Amr Abdelrahman Yousef Abdelrahman Mostafa, Munich (DE);
Panagiotis Botsinis, Munich (DE);
Sameh M. Eldessoki, Munich (DE);
Tarik Tabet, Carlsbad, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 18/370,384

(22) Filed: Sep. 19, 2023

(65) Prior Publication Data
US 2024/0106571 A1 Mar. 28, 2024

(30) Foreign Application Priority Data
Sep. 23, 2022 (GR) .............................. 20220100781

(51) Int. Cl.
*H04L 1/1607* (2023.01)
*H04L 1/1812* (2023.01)
*H04L 5/00* (2006.01)

(52) U.S. Cl.
CPC .......... *H04L 1/1642* (2013.01); *H04L 1/1816* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 6,947,394 B1 * | 9/2005 | Johansson | H04L 1/188 370/282 |
| 2009/0178087 A1 * | 7/2009 | Menn | H04L 1/1838 725/86 |
| 2009/0178096 A1 * | 7/2009 | Menn | H04N 21/6377 725/105 |
| 2011/0154146 A1 * | 6/2011 | Shin | H04L 1/1832 714/749 |
| 2014/0233490 A1 * | 8/2014 | Yi | H04L 1/1874 370/329 |

FOREIGN PATENT DOCUMENTS

EP          1648183 A1 * 4/2006 ............. H04L 1/187

OTHER PUBLICATIONS

Ashkan Moharramia, Mohammad Ghasempoura, Mohammad Ghanbaria an In-router Identification Scheme for Selective Discard of Video Packets (Year: 2021).*

* cited by examiner

*Primary Examiner* — Guerrier Merant
(74) *Attorney, Agent, or Firm* — Fish & Richardson P.C.

(57) ABSTRACT

Disclosed are methods, systems, and computer-readable medium to perform operations for selective re-transmission of radio link channel (RLC) service data units (SDUs). In one aspect, the method can include actions of determining that transmission of an RLC SDU having a first sequence number was not successful, determining whether to re-transmit the RLC SDU, and based on a determination that the particular RLC SDU is not to be re-transmitted: moving a start location of an RLC transmission window to an RLC SDU that (i) has a sequence number that is greater than the first sequence number and (ii) has not been acknowledged, and transmitting a transmission to another device that indicates that the RLC SDU having the first sequence number is to be skipped.

19 Claims, 14 Drawing Sheets

700A

Control PDU indicating new RX_NEXT with 12bit SN

| D/C | CPT | NEW_RX_NEXT_SN |
|---|---|---|
| | NEW_RX_NEXT_SN | |

Control PDU indicating SN(s) to be ignored with 12bit SN

| D/C | CPT | R | R | R |
|---|---|---|---|---|
| | IGNORE_SN | | | |
| IGNORE_SN | | R | R | E |

Control PDU indicating new RX_NEXT with 18bit SN

| D/C | CPT | NEW_RX_NEXT_SN |
|---|---|---|
| | NEW_RX_NEXT_SN | |
| NEW_RX_NEXT_SN | R | R |

Control PDU indicating SN(s) to be ignored with 18bit SN

| D/C | CPT | R | R | R |
|---|---|---|---|---|
| | IGNORE_SN | | | |
| | IGNORE_SN | | | |
| IGNORE_SN | R | R | R | E |

FIG. 7D

RLC AM SELECTIVE RETRANSMISSION AND WINDOW MOVEMENT

CROSS-REFERENCE TO RELATED APPLICATION

This application claims priority under 35 U.S.C. § 119(b) to Greek Patent Application No. 20220100781, filed on Sep. 23, 2022, the entire contents of which are hereby incorporated by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

Wireless communication networks can include a Radio Link Control (RLC) Layer, aspects of which can be specified by 3GPP TS 38.222. The RLC layer is part of the Radio Access Network (RAN) and operates between user equipment (UE) and a base station. The RLC layer can be used to transfer user plane data in one of three modes—i.e., Transparent Mode, Unacknowledged Mode, or Acknowledged Mode.

Transparent mode (TM) RLC is only applicable to the Control Plane and can be used to send a subset of RRC messages. For example, TM RLC can be used to send broadcast control channel (BCCH) messages, paging control channel messages (PCCH), and common control channel messages (CCCH). BCCH messages can include MIB, SIB1, and system information. PCCH messages can include paging. CCCH messages can include RRCSetupRequest, RRCSEtup, RRCReject, RRCReestablishmentRequest, RRCResumeRequest, RRCResumeRequest1, and RRCSystemInfoRequest.

Unacknowledged mode (UM) RLC is only applicable to the User Plane and cannot be used to transfer RRC signaling messages. UM RLC supports segmentation of higher layer packets. This allows large packets to be divided into smaller packets when the allocated air-interface resources are not sufficient to accommodate the original packet size.

Acknowledged Mode (AM) RLC is applicable to both the User Plane and the Control Plane and supports automatic repeat request (ARQ) protocol to provide reliable data transfer service. This means that AM RLC supports re-transmissions. The receiving device of AM RLC returns status reports using, for example, a control PDU to provide acknowledgment information to the sending device. AM RLC also supports both segmentation and re-segmentation of higher layer packets. Segmentation is similar to that provided by UM RLC. Re-segmentation is necessary if a re-transmission is required by the capacity of allocated air-interface resources has been reduced.

SUMMARY

The present disclosure generally relates to a devices, systems, methods, and computer programs for Radio Link Control (RLC) layer Acknowledged Mode (AM) selective retransmission and window movement. In some implementations, the present disclosure enables detection of a failed transmission of an RLC SDU in AM and then determining whether the RLC SDU packet is to be re-transmitted. The determination as to whether the RLC SDU is to be re-transmitted can be based on a variety of factors including, for example, a level of importance of the RLC SDU, a number of unsuccessful transmissions of the RLC SDU, or a combination thereof.

The selective re-transmission of RLC SDU solves problems that arise in conventional systems employing RLC SDU transmission in UM and AM. First, UM does not provide an automatic retransmission operation. Second, while conventional RLC SDU transmission in AM provides automatic retransmission, such automatic retransmission will continue to make retransmission attempts of an RLC SDU until the successful acknowledgement of RLC SDU transmission is received, which causes added latency, jitter, and stalling of the movement of a transmission window, stalling of the movement of a receiving window, stalling of both windows, or a combination these drawbacks, among other things. The present disclosure solves these problems by enabling a device to terminate the re-transmission process for certain RLC SDUs and advance the transmission and receiving windows In accordance with innovative aspect of the present disclosure, a method for selective re-transmission of radio link channel (RLC) service data units (SDUs) is disclosed. In one aspect, the method can include determining that transmission of an RLC SDU having a first sequence number was not successful, determining whether to re-transmit the RLC SDU, and based on a determination that the particular RLC SDU is not to be re-transmitted: moving a start location of an RLC transmission window to an RLC SDU that (i) has a sequence number that is greater than the first sequence number and (ii) has not been acknowledged, and transmitting a transmission to another device that indicates that the RLC SDU having the first sequence number is to be skipped.

Other aspects includes apparatuses, systems, and computer programs for performing the actions of the aforementioned method.

According to another innovative aspect of the present disclosure, a method for selectively moving a receiving window for radio link channel (RLC) service data units (SDUs) is disclosed. In one aspect, the method can include receiving a transmission, from a device, that indicates that an RLC SDU having a first sequence number that is to be skipped, and moving a start location of a receiving window to an RLC SDU that (i) has a sequence number that is greater than the first sequence number and (ii) has not been received.

Other aspects includes apparatuses, systems, and computer programs for performing the actions of the aforementioned method.

According to another innovative aspect of the present disclosure, a method for repurposing an RLC SDU that is to be transmitted is disclosed. In one aspect, the method can include determining that transmission of an RLC SDU having a first sequence number was not successful, determining that the RLC SDU is not to be re-transmitted, replacing the payload of the RLC SDU that is not to be transmitted with a PDCP PDU payload having a different PDCP sequence number than the first PDCP sequence number while using the first RLC sequence number, and transmitting the RLC SDU with the replaced payload.

Other aspects includes apparatuses, systems, and computer programs for performing the actions of the aforementioned method.

According to another innovative aspect of the present disclosure, a method for receiving a re-purposed RLC SDU is disclosed. In one aspect, the method can include receiving a re-purposed RLC SDU that includes a PDCP payload corresponding to a PDCP SN that is within a PDCP reception window, wherein the received RLC SDU comprising the PDCP PDU payload that is within the PDCP reception window replaced a previously received RLC SDU segment, and providing the received re-purposed RLC SDU to a re-ordering function.

Other aspects includes apparatuses, systems, and computer programs for performing the actions of the aforementioned method.

According to another innovative aspect of the present disclosure, a method for receiving a re-purposed RLC SDU is disclosed. In one aspect, the method can include receiving a re-purposed RLC SDU that includes a PDCP payload corresponding to a PDCP SN that is outside of a PDCP reception window, after successful receipt of the re-purposed RLC SDU, moving the receiving window to a start location corresponding to the next RLC SDU location corresponding to an RLC SDU that has not been successfully received, and discarding, by the first device, the received re-purposed RLC SDU.

Other aspects includes apparatuses, systems, and computer programs for performing the actions of the aforementioned method.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE DRAWINGS

FIGS. 7A-7D provide visual representations of multiple different examples of an RLC Control PDU, in accordance with one aspect of the present disclosure.

DETAILED DESCRIPTION

The present disclosure generally relates to a devices, systems, methods, and computer programs for Radio Link Control (RLC) layer Acknowledged Mode (AM) selective retransmission and window movement. In some implementations, the present disclosure enables detection of a failed transmission of an RLC SDU in AM and then determining whether the RLC SDU packet is to be re-transmitted. The determination as to whether the RLC SDU is to be re-transmitted can be based on a variety of factors including, for example, a level of importance of the RLC SDU, a number of unsuccessful transmissions of the RLC SDU, or a combination thereof.

The selective re-transmission of RLC SDU solves problems that arise in conventional systems employing RLC SDU transmission in UM and AM. First, UM does not provide an automatic retransmission operation. Second, while conventional RLC SDU transmission in AM provides automatic retransmission, such automatic retransmission will continue to make retransmission attempts of an RLC SDU until the successful acknowledgement of RLC SDU transmission is received, which causes added latency, jitter, and stalling of the movement of an transmission window, stalling of the movement of a receiving window, stalling of both windows, or a combination these drawbacks, among other things. The present disclosure solves these problems by enabling a device to terminate the re-transmission process for certain RLC SDUs and advance the transmission and receiving windows.

Figure 1:
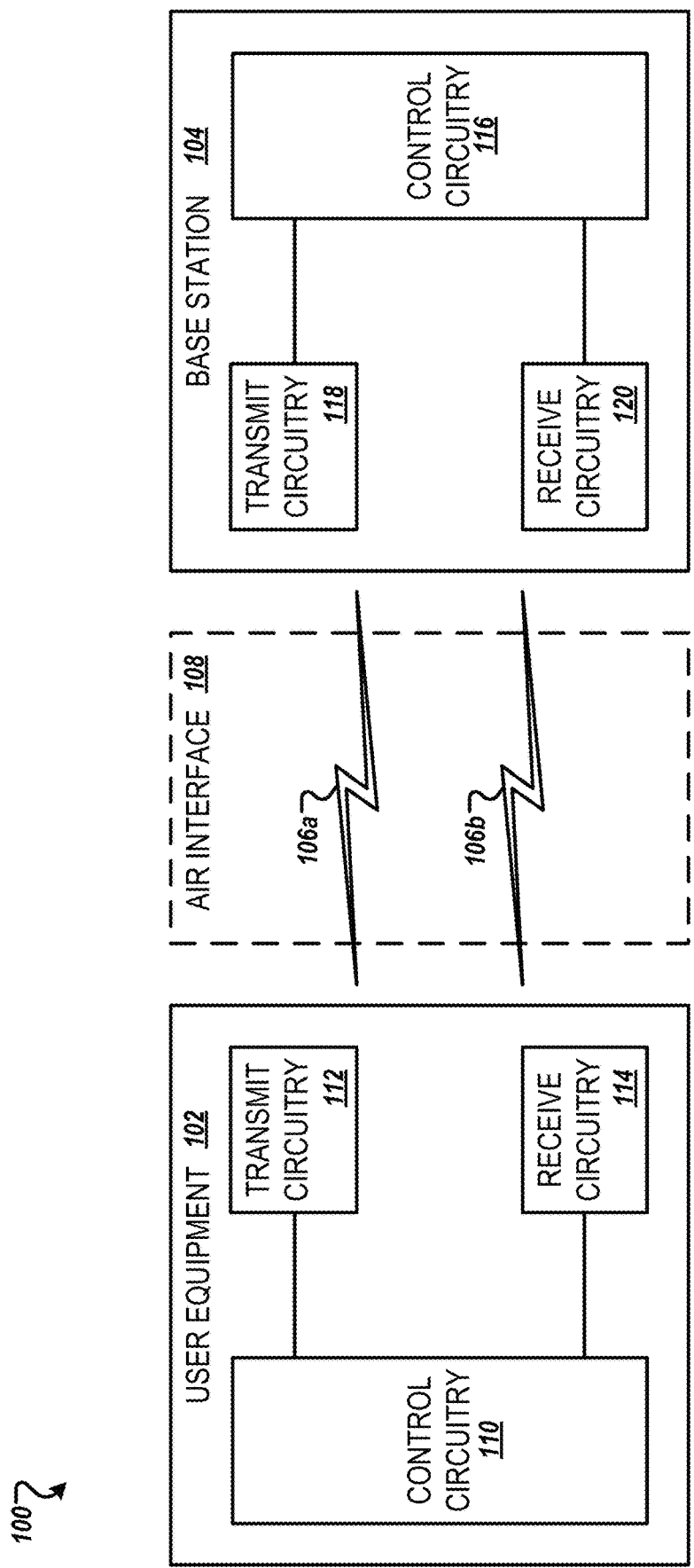
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be a E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE.

The transmit circuitry 112 can perform various operations described in this specification. Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any LIE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

3GPP defines RLC AM/UM for multiple different bearers to distinguish QoS flows and separate/prioritize different streams according to their needs. Using RLC UM provides tighter latency/jitter characteristics but also a less reliable, lossy links compared to RLC AM due to missing RLC (retransmission) ReTx. RLC AM provides 100% loss-less links where re-establishment procedure occurs in case of failures, however this comes at the expense of added latency/jitter.

Separation of streams to AM and UM is based on e.g. Source/Destination IP addresses/ports and NextHeader information and assumes that those streams are homogeneous in themselves, where each packet is of equal importance. When all traffic is mapped to the same bearer (e.g., non-GBR bearer), or within a data stream there are different packet types with different importance (see figure), there are no means to overcome the below mentioned Latency/Jitter adders of RLC AM while at the same time have higher reliability than RLC UM Under bad radio conditions with high BLER the RLC AM uses retransmissions to recover lost packets. As a result, RLC AM uses additional bandwidth (BW) for the ReTX which adds latency to the initial transmission of new packets.

ReTX may cause window stalling on TX side and therefore Head-of-line blocking (HOL blocking), as RLC AM has to wait until all packets are received before moving the TX/RX window. As a result, there is increased TX latency.

ReTX causes out-of-order RLC packet reception, which may require reordering functionality (in 4G in RLC, in 5G in PDCP) in order to deliver all packets in order towards higher layers (IP). As a result, there is increased RX latency.

Finally a maximum number of RLC ReTX may lead to RRC Reestablishment. As a result, data stalls for several hundreds of milliseconds can occur until the data radio bearers (DRBs) are reestablished.

The present disclosure addresses each of these drawbacks of RLC AM Retx.

Figure 2:
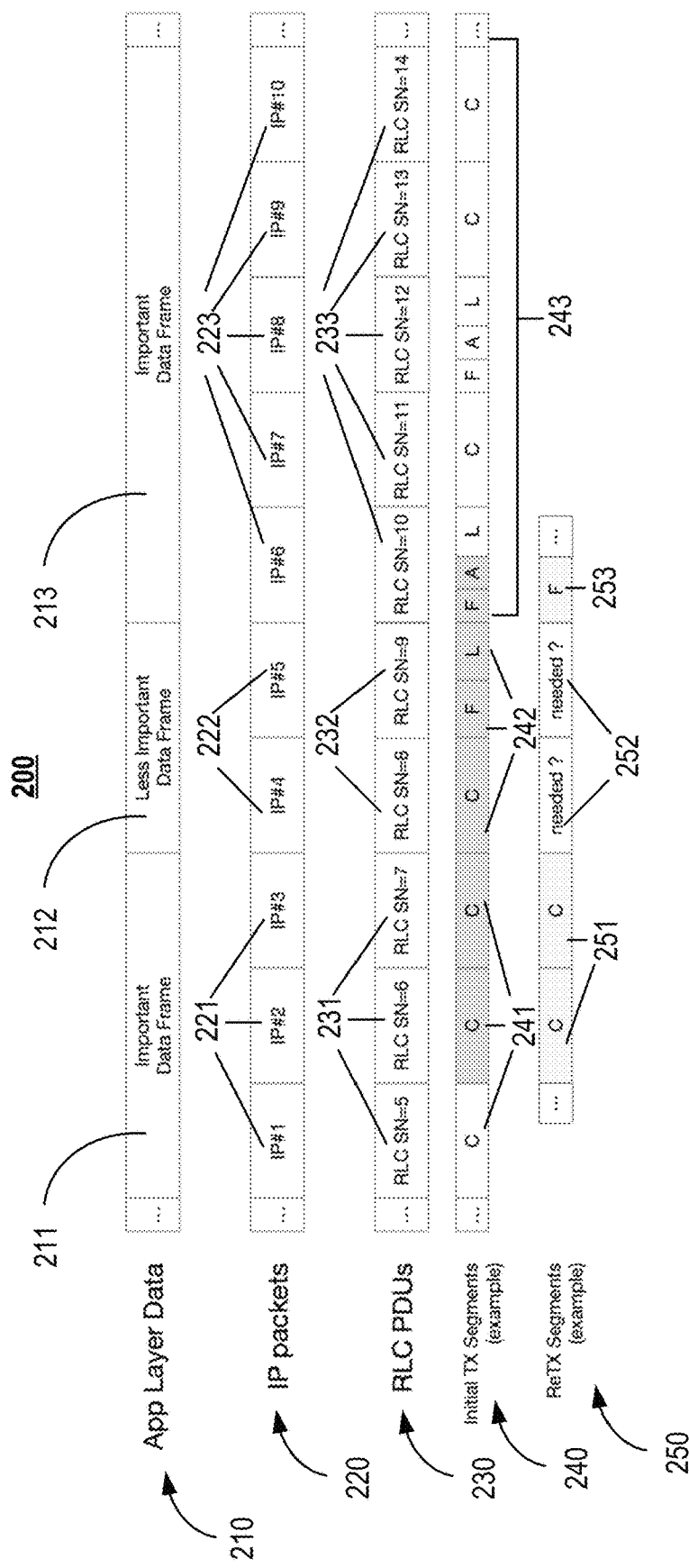
FIG. 2 illustrates a visual representation of a heterogeneous data stream.

FIG. 2 illustrates a visual representation of a heterogeneous data stream 200. The heterogeneous data stream can include an application layer 210, an IP packet layer 220, and an RLC PDU layer 230. In the example of FIG. 2, the heterogeneous data stream 200 may be, for example, a video data stream.

As shown in FIG. 2, the data transmitted by the application may be important data frames 211, 213 such as I-frames and less important data frames 212 such as P-Frames or B-Frames. This application layer data 211, 212, 213 may be mapped to different IP packets 221, 222, and 223 respectively. Then, the IP packets may be mapped to different RLC PDUs 231, 232, 233.

In the RLC layer AM transmission, the RLC segments are transmitted. In this example, the RLC segments corresponding to the 241 and 243 corresponding to the important data frames are transmitted and received at 251, 253. However, the less important data frame corresponding to RLC segments 242 are not successfully received after an initial transmission at 252.

In conventional systems, a device executing RLC Layer AM transmission would continue to retransmit. However, the present disclosure enables for subsequent transmission of these RLC segments 242 corresponding to less important higher level data 212, 222 to be stopped, the RLC segments 242 to be skipped, and the RLC transmission window to be advanced.

Figure 3:
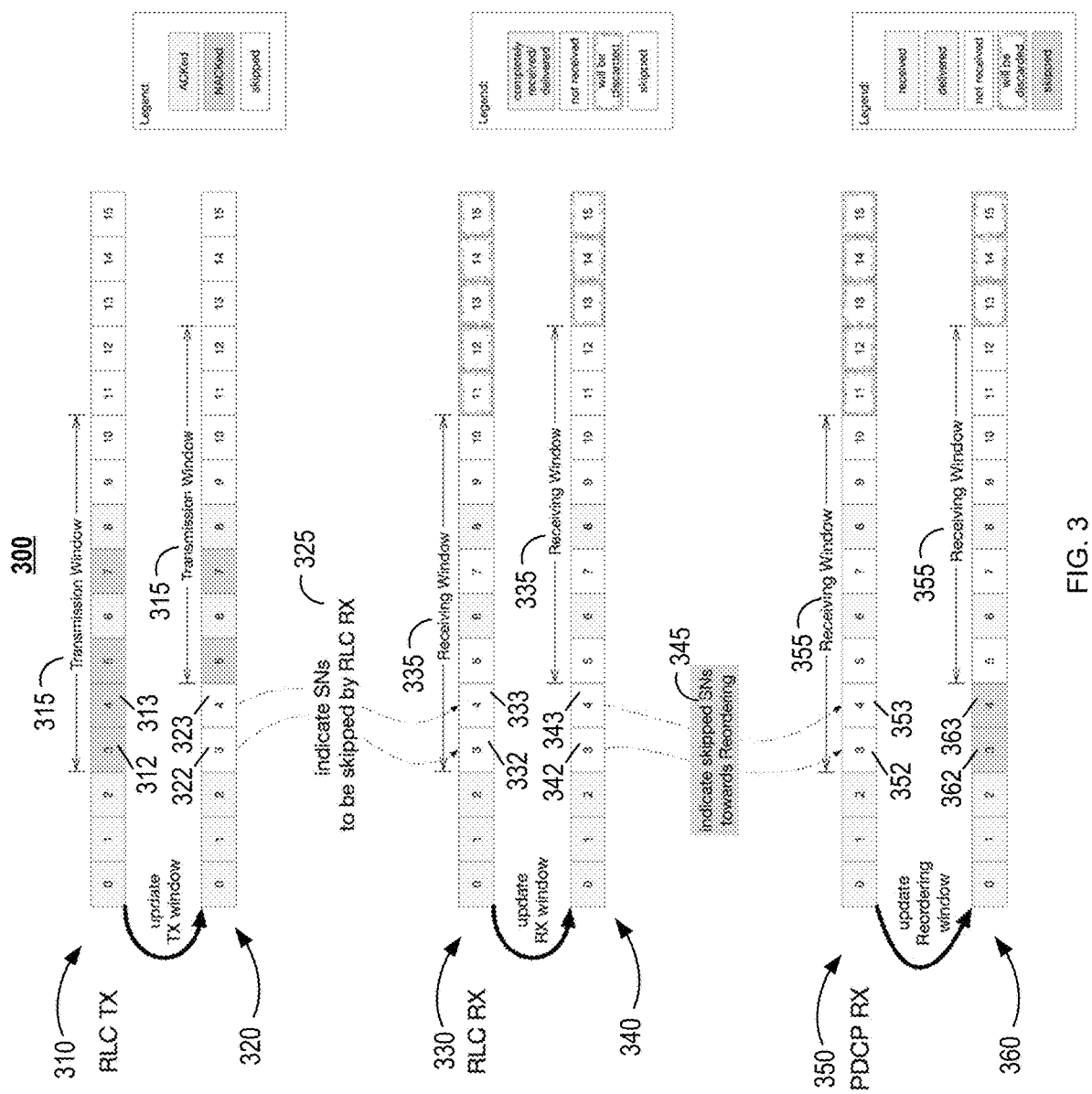
FIG. 3 illustrates a visualization of packet buffers showing stages of an example of a process for RLC AM selective retransmission and window movement, in accordance with one aspect of the present disclosure.

FIG. 3 illustrates a visualization 300 of packet buffers showing stages of an example of a process for RLC AM selective retransmission and window movement, in accordance with one aspect of the present disclosure. For example, FIG. 3 shows an enhancement to the RLC AM protocol that enables window moving operations when a certain amount of ReTx attempts were not successful, or when less important data is affected by BLER and RLC ReTx, RLC may use higher layer (App layer) information to decide on data importance.

In the example of FIG. 3, the transmitting (Tx) device has a RLC Tx buffer in a first state 310 with the transmission window 315 starting at an RLC SDU 312 having a sequence number of 3. The Tx device transmits at least the RLC SDU 312 and the RLC SDU 313 and determines that the RLC SDUs 312, 313 were not successfully transmitted. For example, the Tx device can receive a NACK responsive to the transmissions of RLC SDUs 312, 313.

Upon reception of NACK for RLC SDU SNs 312, 313 from the receiving (Rx) device, the Tx device can determine whether the RLC SDU SNs 312, 313 are to be re-transmitted. This determination is made based on the number of unsuccessful Tx attempts, the level of importance of the RLC SDU 312, 313, or a combination of both. For example, if the number of unsuccessful Tx attempts satisfies a predetermined threshold, then the Tx device can determine that the RLC SDUs 312, 313 are not to be retransmitted. Alternatively, or in addition, the Tx device an determine whether the level of importance for the RLC SDUs 312, 313 satisfies a predetermined threshold. If the level of importance for the RLC SDUs 312, 313 do not satisfy the predetermined threshold, then the RLC SDUs 312, 313 may be determined to be not important and, therefore, not be re-transmitted.

Based on a determination that the RLC SDU SNs 312, 313 are not to be retransmitted, the Tx device can send information 325 back to Rx RLC device that the NACKed RLC SDU SNs 312 313 shall be skipped and that the receiving window 335 is to be moved. The information 325 can include an RLC Control PDU shown in FIGS. 7A-7D. The Tx device also moves the Window 315 forward passed the NACKed RLC SDU SNs 312, 313 that are to be skipped. The updated state of the RLC Tx buffer is shown at stage 320. The RLC SDU SNs 3 and 4 322, 323 are skipped and the RLC SDU transmission window 315 so that the starting location of the RLC SDU transmission window 315 is after the skipped RLC SDU SNs 3 and 4 322, 323.

The Rx device receives the information 325 indicating RLC SDU SNs to be skipped, a new starting location for the receiving window 335, or both. Based on the received information 325, the Rx device an update the state of the RLC Rx buffer from state 330 with RLC SDU SNs 332, 333 within the receiving window 335 to state 340 with RLC SDU SNs 342, 343 marked as skipped and the receiving window 335 advanced beyond the skipped RLC SDU SNs 342, 343.

The Rx device can indicate 345 to a PDCP level re-ordering function the RLC SDU SNs 3 and 4 352, 353 that are to be skipped. The PDCP level re-ordering function can update the state of the PDCP buffer from state 350 with RLC SDU SNs 3 and 4 352, 353 within the receiving window 355 to state 360 with RLC SDU SNs 3 and 4 362, 363 marked as skipped and the receiving window 355 advanced beyond the skipped RLC SDU SNs 3 and 4 362, 363.

In the example of FIG. 3, no unnecessary RLC ReTX happens that consumes BW and additional latency and no data stalls due to Reestablishment.

Likewise, in the example of FIG. 3, RX Reordering can be unblocked to not wait for missing SNs. RLC may inform the reordering function about the gap(s) to also update the reordering window (in 5G that is PDCP, while in 4G that is within RLC). No unnecessary additional reordering latency is accumulated as the waiting for packets can be skipped right away In addition, in the example of FIG. 3, a PDCP Discard Timer reach can be extended towards the RX Reordering/Reassembly windows. In Legacy only the packets that where not yet assigned an RLC SN on the TX side can be discarded. With this, any RLC SN can be discarded even if it already resides in the RX reordering window.

The process described with respect to the example of FIG. 3 provides a number of benefits. For example, the process described with respect to the example of FIG. 3 is more reliable than RLC UM since ReTX are possible on RLC level and has lower latency under bad radio conditions. The process described with reference to FIG. 3 has no unnecessary usage of BW for ReTX of less important packets and no Head-of-line blocking (HOL blocking) due to TX/RX windows stall. The process described with reference to FIG. 3 has no reordering latency due to ReTX of less important packets and no data stall due to RRC Reestablishment caused by RLC max ReTX on less important packets.

In addition, the process described with respect to the example of FIG. 3 provides extended PDCP Discard Timer reach towards the RX Reordering/Reassembly windows, has the possibility to be standardized, and has the possibility for a proprietary solution by having agreements with Operators/Vendors.

Figure 4:
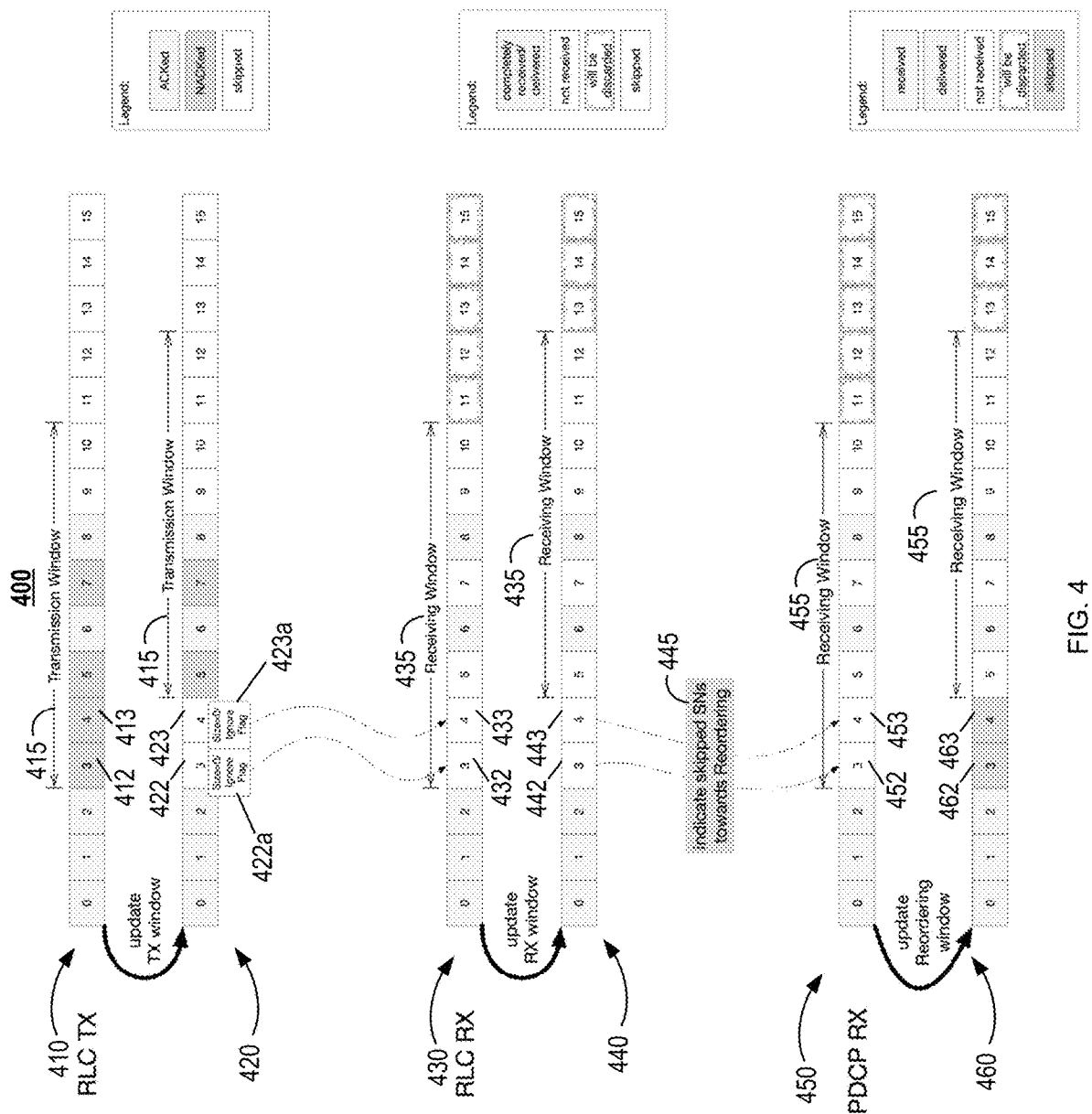
FIG. 4 illustrates a visualization of packet buffers showing stages of another example of a process for RLC AM selective retransmission and window movement using an RLC Control PDU with ignore indication, in accordance with one aspect of the present disclosure.

FIG. 4 illustrates a visualization 400 of packet buffers showing stages of another example of a process for RLC AM selective retransmission and window movement using an RLC Control PDU with ignore indication, in accordance with one aspect of the present disclosure. For example, FIG. 4 shows an enhancement to the RLC AM protocol to allow for RLC PDUs to be ignored.

In the example of FIG. 4, the transmitting (Tx) device has a RLC Tx buffer in a first state 410 with the transmission window 415 starting at an RLC SDU 412 having a sequence number of 3. The Tx device transmits at least the RLC SDU 412 and the RLC SDU 413 and determines that the RLC SDUs 412, 413 were not successfully transmitted. For example, the Tx device can receive a NACK responsive to the transmissions of RLC SDUs 412, 413.

Upon reception of NACK for RLC SDU SNs 412, 413 from the receiving (Rx) device, the Tx device can determine whether the RLC SDU SNs 412, 413 are to be re-transmitted. This determination is made based on the number of unsuccessful Tx attempts, the level of importance of the RLC SDU 412, 413, or a combination of both. For example, if the number of unsuccessful Tx attempts satisfies a predetermined threshold, then the Tx device can determine that the RLC SDUs 412, 413 are not to be retransmitted. Alternatively, or in addition, the Tx device an determine whether the level of importance for the RLC SDUs 412, 413 satisfies a predetermined threshold. If the level of importance for the RLC SDUs 412, 413 do not satisfy the predetermined threshold, then the RLC SDUs 412, 413 may be determined to be not important and, therefore, not be re-transmitted.

Here, instead of transmitting data 345 instructing the Rx device to skip RLC SDU SNs 412, 413, the Tx device generates an RLC SDU SN 422 and RLC SDU SN 423 that includes (i) a payload size of zero or (ii) include an ignore flag. This zero-sized payload or ignore flag is depicted in FIG. 4 as 422a, 423a for RLC SDU SNs 422 and 423, respectively. Then, the RLC SDU SNs 422, 423 can be transmitted to the Rx device. By sending PDU with RLC SDU SN 422, 423 with SDU size=0 (or an ignore flag), the Tx device can indicate to the Rx device that the RLC SDU SNs 422, 423 are to be ignored, or otherwise skipped. The updated second state of the RLX Tx buffer 420 shows RLC SDU SNs 422, 423 as being skipped and advances the transmission window to RLC SDU SN 5. Accordingly, the Rx device can be configured by specification such that such PDUs or SDUs to be considered as "received and to be discarded on RLC level." In some implementations, the device specification can be written as, for example, with the following rule or requirement: "if RLC SDU of size '0', is received then do not deliver it to higher layers (i.e., PDCP) after the Reassembly step."

A similar outcome can be achieved by sending a small PDU with SN=x (e.g., 1 Byte) and adding a special bit to the RLC header of the PDU SN=x (e.g., Reserved bit) that shall be interpreted as "received and to be discarded on RLC level."

In the example of FIG. 4, the Rx device can receive the RLC SDU SN 422, 423 in RLC SDU SN 3 and 4 432, 433 within the receiving window at RLC buffer state 430. The Rx device can determine, based on the zero size of the payload or ignore flag that the RLC SDU SN 432, 433 are to be ignored and then update the state of the RLC Rx buffer to 440 by marking RLC SDU SN 3 and 4 as skipped and advancing the receiving window 435. In some implementations, an Rx device is to inform 445 the reordering function (i.e., receiving PDCP entity in 5G) about the gap(s) due to skipped RLC SN(s) that RLC SDUs 452, 453 corresponding to 442, 443 are to be ignored, or otherwise skipped. The PDCP Rx 460 can mark the corresponding PDCP PDUs 462, 463 as skipped and advancing the receiving window to SN 5. Thus, the reordering window unblocks packet delivery to higher layers.

The implementation of FIG. 4 provides multiple benefits such as lower latency under bad radio conditions as only small (dummy) data is retransmitted, avoids RRC Reestablishments and data stall could be standardised or proprietary Operator/Vendor agreement.

Figure 5:
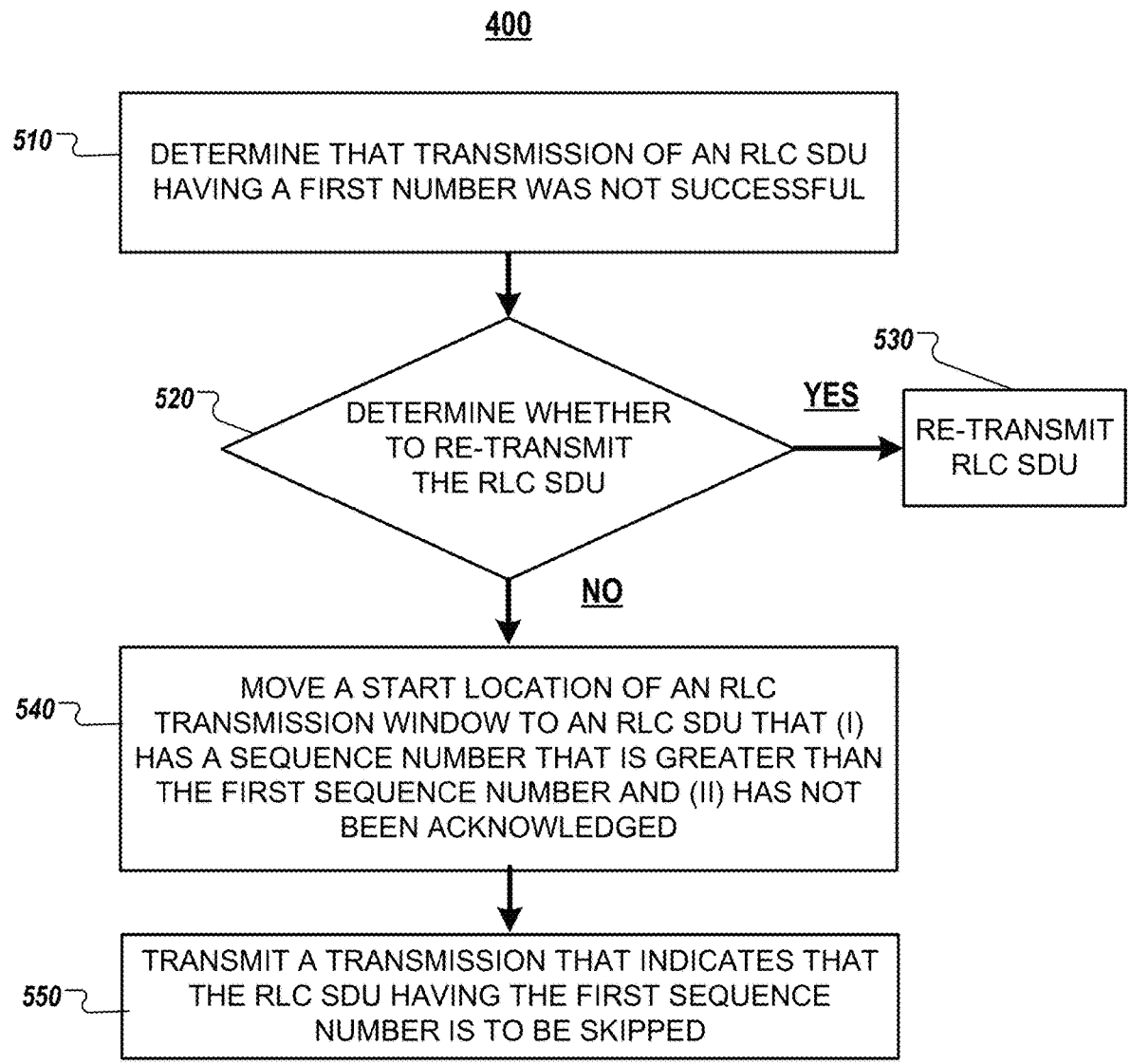
FIG. 5 is a flowchart of an example of a process for RLC AM selective retransmission and window movement performed by a transmission (Tx) device, in accordance with one aspect of the present disclosure.

FIG. 5 is a flowchart of an example of a process 500 for RLC AM selective retransmission and window movement performed by a transmission (Tx) device, in accordance with one aspect of the present disclosure. The process 500 will be described as being performed by a first device such as a UE 102 of FIG. 1. However, the process 500 is not so limited and can also be performed by a different device such as a base station 104 of FIG. 1. It will be understood that process 500 can be performed, for example, by any suitable system, environment, software, hardware, or a combination of systems, environments, software, and hardware, as appropriate. In some implementations, various steps of process 500 can be run in parallel, in combination, in loops, or in any order.

A first device can begin execution of the process 500 by determining that transmission of an RLC SDU having a first sequence number was not successful (510).

The first device can continue execution of the process 500 by determining whether to re-transmit the RLC SDU (520). In some implementations, the first device can continue execution of the process 500 by determining whether to re-transmit the RLC SDU can include determining a level of importance of the RLC SDU based on higher layer information associated with the RLC SDU, and determining whether to re-transmit the RLC SDU based on the determined level of importance of the RLC SDU. In some implementations, the higher layer information associated with the RLC SDU is a type of IP packet from which the RLC SDU is derived. In some implementations, the higher layer information associated with the RLC SDU is an importance value assigned, by an application, to an IP packet from which the RLC SDU is derived.

In some implementations, the first device can continue execution of the process 500 determining whether to re-transmit the RLC SDU based on the determined level of importance of the RLC SDU can include based on a determination that the level of importance does not satisfy a predetermined threshold, determining that the RLC SDU is not to be re-transmitted. Alternatively, in some implementations, the first device can continue execution of the process 500 by determining whether to re-transmit the RLC SDU based on the determined level of importance of the RLC SDU can include based on a determination that the level of importance satisfies a predetermined threshold, determining that the RLC SDU is to be re-transmitted.

In some implementations, the first device can continue execution of the process 500 by determining whether to re-transmit the RLC SDU can include determining a number of times the RLC SDU has been unsuccessfully transmitted. In such implementations, based on a determination that the determined number of unsuccessful transmissions does not satisfy a predetermined threshold, the first device can continue execution of the process 500 by determining that the RLC SDU is to be re-transmitted. Alternatively, based on a determination that the determined number of unsuccessful transmissions satisfies a predetermined threshold, the first device can continue execution of the process 500 by determining that the RLC SDU is not to be re-transmitted.

Based on a determination, by the first device, that the RLC SDU is to be re-transmitted, the first device can continue execution of the process 500 by re-transmitting the RLC SDU to a second device (530).

Alternatively, based on a determination, by the first device, that the particular RLC SDU is not to be re-transmitted, the first device can continue execution of the process 500 by moving a start location of an RLC transmission window to an RLC SDU that (i) has a sequence number that is greater than the first sequence number and (ii) has not been acknowledged (540).

The first device can continue execution of the process 500 by transmitting a transmission to another device (e.g., a second device) that indicates that the RLC SDU having the first sequence number is to be skipped (550). In some implementations, the first device can include a UE and the second device can include a base station. Alternatively, the first device can include a base station and the second device can include a UE.

In some implementations, a first device can continue execution of the process 500 by generating an RLC PDU having a sequence number that corresponds to the first sequence number and a payload size of zero. In such implementations, transmitting a transmission at stage 550 to a second device that indicates that the RLC SDU having the first sequence number is to be skipped can include transmitting the generated RLC PDU having a payload size of zero to the second device.

In some implementations, the transmission at stage 550 can include an RLC Control PDU indicating a new RX_NEXT location for advancing the RLC receiving window used by the other device (e.g., second device). In some implementations, the new RX_Next location is the new start location of the RLC receiving window used by the other device (e.g., second device). In some implementations, the transmission at stage 550 comprises an RLC Control PDU indicating the first sequence number of the RLC SDU that is to be skipped.

The example method 500 shown in FIG. 5 can be modified or reconfigured to include additional, fewer, or different steps (not shown in FIG. 5), which can be performed in the order shown or in a different order.

Figure 6:
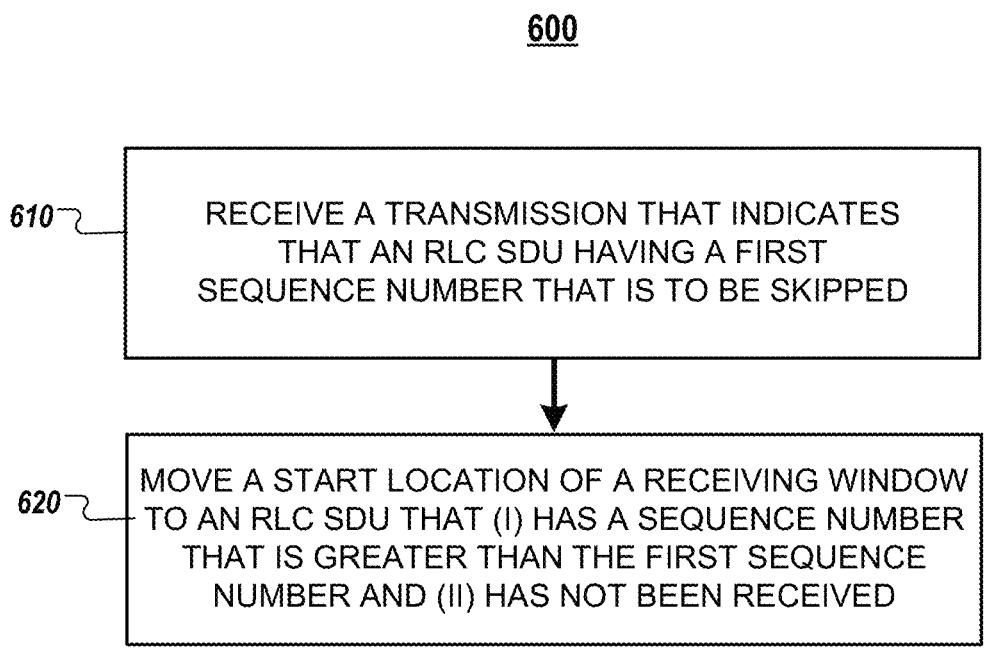
FIG. 6 is a flowchart of an example of a process for RLC AM selective retransmission and window movement performed by a receiving (Rx) device, in accordance with one aspect of the present disclosure.

FIG. 6 is a flowchart of an example of a process 600 for RLC AM selective retransmission and window movement performed by a receiving (Rx) device, in accordance with one aspect of the present disclosure. The process 600 will be described as being performed by a first device such as a UE 102 of FIG. 1. However, the process 600 is not so limited and can also be performed by a different device such as a base station 104 of FIG. 1. It will be understood that process 600 can be performed, for example, by any suitable system, environment, software, hardware, or a combination of systems, environments, software, and hardware, as appropriate. In some implementations, various steps of process 600 can be run in parallel, in combination, in loops, or in any order.

The first device can begin execution of the process 600 by receiving a transmission, from a second device, that indicates that an RLC SDU having a first sequence number that is to be skipped (610). In some implementations, the first device can include a UE and the second device can include a base station. In other implementations, the first device can include a base station and the second device can include a UE.

The first device can continue execution of the process 600 by moving a start location of a receiving window to an RLC SDU that (i) has a sequence number that is greater than the first sequence number and (ii) has not been received (620).

In some implementations, the first device can continue execution of the process 600 by instructing a reordering function running on the first device that a PDU corresponding to the first sequence number is to be skipped.

In some implementations, the first device can continue execution of the process 600 by moving a start location of a reordering window to a PDU that (i) has a sequence number that is greater than the first sequence number and (ii) has not been received.

In some implementations, the reordering window is a PDCP reordering window.

In some implementations, the received transmission that indicates that an RLC SDU having a first sequence number that is to be skipped comprises an RLC Control PDU that includes a start location for the receiving window.

In some implementations, the received transmission, from the device, that indicates that an RLC SDU having a first sequence number that is to be skipped comprises an RLC Control PDU that includes the first sequence number that is to be skipped.

In some implementations, received transmission, from the device, that indicates that an RLC SDU having a first sequence number that is to be skipped comprises an RLC PDU having a sequence number that corresponds to the first sequence number and a payload size of zero.

FIGS. 7A-7D provide visual representations of multiple different examples of an RLC Control PDU, in accordance with one aspect of the present disclosure. Such RLC Control PDUs can be used to enhance the RLC AM protocol with new RLC Control PDU from Tx to Rx.

In some implementations, such as the RLC Control PDU 700A and 700C of FIGS. 7A and 7C, respectively, the RLC Control PDU can indicate a window move operations using a NEW_RX_NEXT_SN (or RX_NEXT) field. The NEW_RX_NEXT_SN field can indicate a new starting location for a RLC window such as a receiving window. The NEW_RX_NEXT_SN field can be a 12-bit sequence number field 700A or a 18-bit sequence number field 700C.

In some implementations, such as the RLC Control PDU 700B and 700D of FIGS. 7B and 7C, respectively, the RLC Control PDU can indicate one or more RLC SDU sequence numbers (SN)s that shall be skipped using an IGNORE_SN field. The IGNORE_SN field can accommodate information indicating the one or more RLC SDU SNs that shall be skipped. The INGORE_SN field can be a 12-bit number 700B or an 18-bit number 700D.

One or more of these RLC Control PDUs 700A, 700B, 700C, 700D can be received to inform the reordering function (i.e., receiving PDCP entity in 5G) about the gap(s) due to skipped RLC SN(s). In some implementations, the reordering window update unblocks packet delivery to higher layers.

In some implementations, each RLC Control PDU 700A, 700B, 700C, 700D can include a CPT field. The CPT field can be minimally invasive as the Spec defines unknown CPT fields as "to be discarded." In some implementations, this allows for this solution to be applicable even with the current 5G standards by having proprietary agreements with the different infra vendors.

The RLC Control PDUs provide multiple benefits include, for example, lower latency under bad radio conditions, no RRC Reestablishments and data stall, and Operator/Vendor agreement for a proprietary solution possible.

Figure 8:
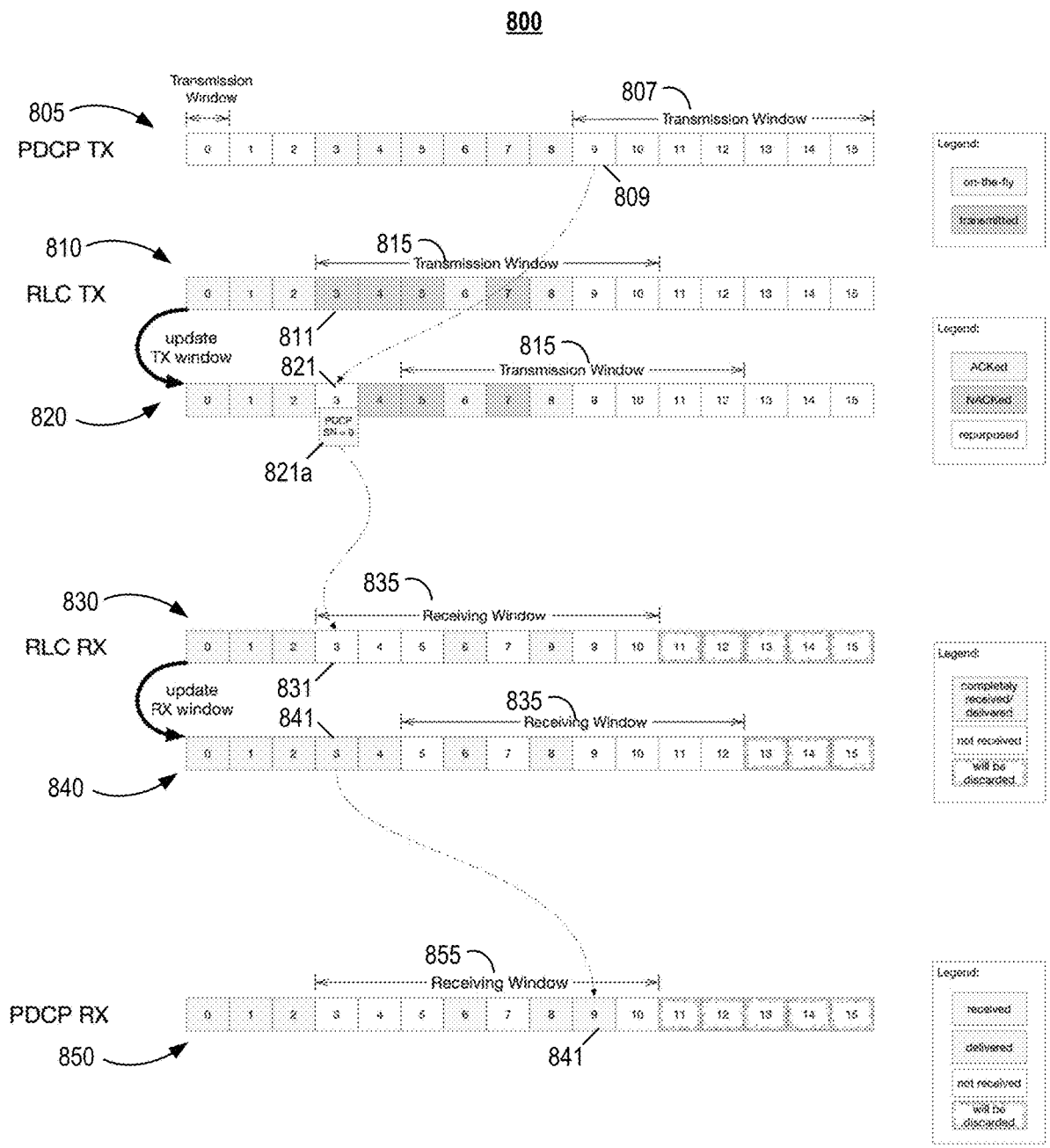
FIG. 8 illustrates a visualization of packet buffers showing stages of an example of a process for re-purposing an RLC SDU that is to be otherwise skipped, in accordance with one aspect of the present disclosure.

FIG. 8 illustrates a visualization 800 of packet buffers showing stages of an example of a process for re-purposing an RLC SDU that is to be otherwise skipped, in accordance with one aspect of the present disclosure.

In the example of FIG. 8, the transmitting (Tx) device has a RLC Tx buffer in a first state 810 with the transmission window 815 starting at an RLC SDU 811 having a sequence number of 3. The Tx device transmits at least the RLC SDU 811 and determines that the RLC SDU 811 was not successfully transmitted. For example, the Tx device can receive a NACK responsive to the transmission of RLC SDU 811.

Upon reception of NACK for RLC SDU SN 3 811 from the receiving (Rx) device, the Tx device can determine whether the RLC SDU SN 3 811 is to be re-transmitted. This determination is made based on the number of unsuccessful Tx attempts to transmit RLC SDU 811, the level of importance of the RLC SDU 811, or a combination of both. For example, if the number of unsuccessful Tx attempts satisfies a predetermined threshold, then the Tx device can determine that the RLC SDU 811 is not to be retransmitted. Alternatively, or in addition, the Tx device an determine whether the level of importance for the RLC SDU 811 satisfies a predetermined threshold. If the level of importance for the RLC SDU 811 does not satisfy the predetermined threshold, then the RLC SDU 811 may be determined to be not important and, therefore, not be re-transmitted.

In such a scenario and in accordance with the example of FIG. 8, the Tx device can repurpose the RLC SDU 811. For example, the updated state RLC Tx buffer 820 shows that the RLC SDU 811 has been repurposed as RLC SDU 821. RLC SDU 821 has had its payload replaced with the payload of PDCP PDU 809 that is within the transmission window 807 of the PDCP Tx buffer 805. Replacing the RLC SDU 811 with the PDCP PDU 809 payload and sequence number 821a results in the new RLC SDU 821 that has the PDCP PDU 809 payload and sequence number within the RLC SDU 811 and overriding the prior contents of RLC SDU 811, while the RLC SDU 821 is still associated with the RLC SDU 811 sequence number 3. This repurposed RLC SDU 821 can then be transmitted to the Rx device as a complete segment such as with RLC SDU 821's sequence number of 3 and filled the contents of PDCP PDU sequence number 9 809 instead of a less important, or outdated packet 811 that was NACKed.

The Rx device can receive the repurposed RLC SDU SN 3 821 and acknowledge its receipt, as shown in the updated RLC Rx buffer 840. Upon acknowledgement of RLC SDU SN 3 841, the Rx device can advance the receiving window 835 one or more RLS SDU SNs, as shown in 840. The Rx device can then provide the repurposed RLC SDU SN 3 841 to the reordering function to be re-ordered and placed in the correct PDU SN slot 841 within the receiving window 855 of the PDCP Rx 850.

In such implementations, a PDCP SNs 809 will be sent out-of-order in the payload of RLC SDU 821 compared to legacy, but due to PDCP reordering functionality this becomes transparent to the receivers higher layers.

In some implementations, if PDCP in-order-delivery is active, more reordering happens on PDCP, but above PDCP it shall still be in order. Otherwise, out-of-order packet delivery is allowed by definition.

The example of FIG. 8 provides multiple benefits including lower latency under bad radio conditions as unnecessary ReTX is saved by using it for more relevant data, avoidance of RRC Reestablishments and data stall, and could be standardised or proprietary Operator/Vendor agreement.

Figure 9:
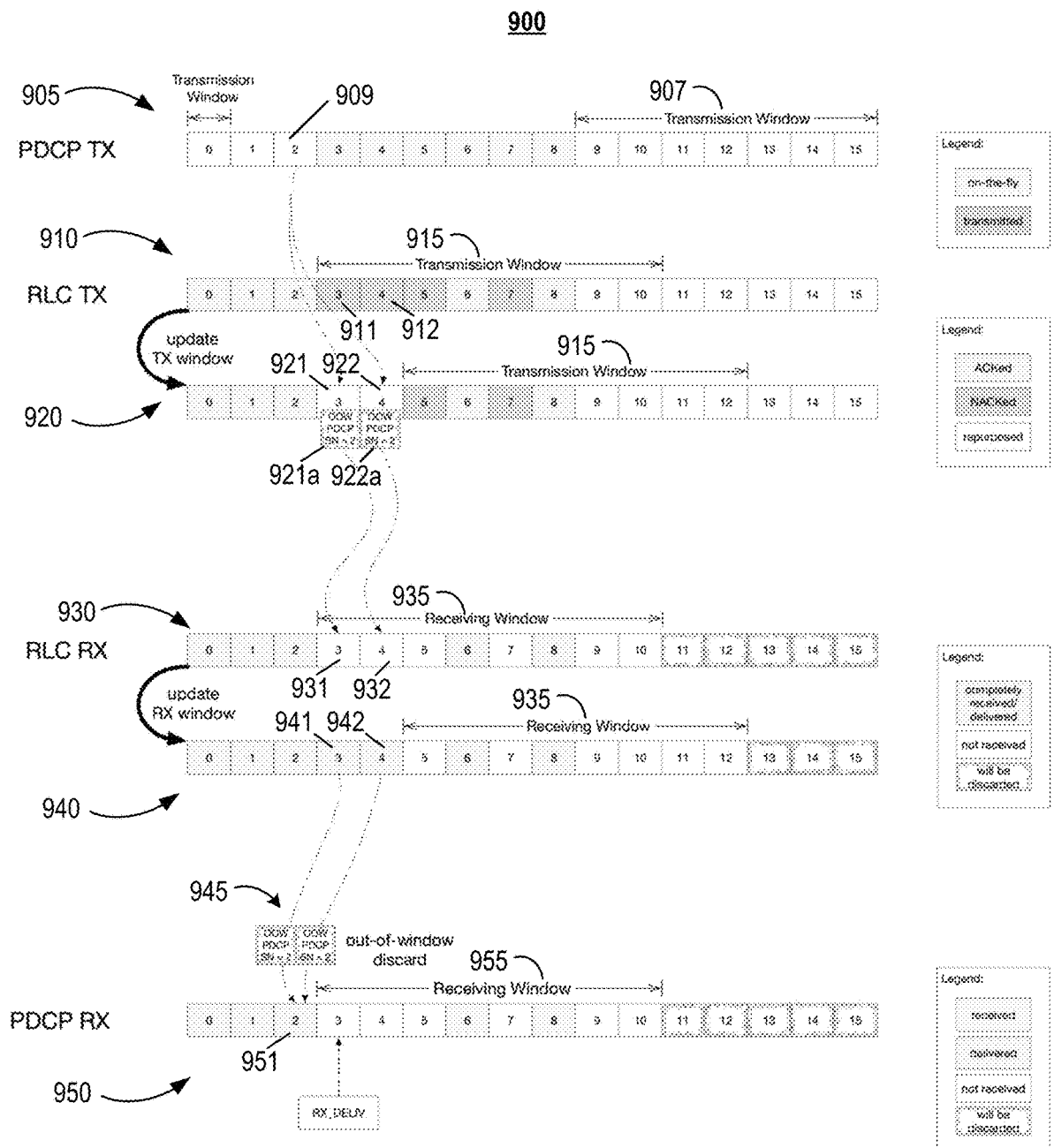
FIG. 9 illustrates a visualization of packet buffers showing stages of an example of a process of another process for re-purposing an RLC SDU that is to be otherwise skipped, in accordance with one aspect of the present disclosure.

FIG. 9 illustrates a visualization 900 of packet buffers showing stages of an example of a process of another process for re-purposing an RLC SDU that is to be otherwise skipped, in accordance with one aspect of the present disclosure.

In the example of FIG. 9, the transmitting (Tx) device has a RLC Tx buffer in a first state 910 with the transmission window 915 starting at an RLC SDU 911 having a sequence number of 3. The Tx device transmits at least the RLC SDU 911 and RLC SDU 912 and determines that the RLC SDU 911 and RLC SDU 912 were not successfully transmitted. For example, the Tx device can receive a NACK responsive to the transmission of RLC SDUs 911 and 912.

Upon reception of NACKs for RLC SDU SNs 911 and 912 from the receiving (Rx) device, the Tx device can determine whether the RLC SDU SNs 911 and 912 are to be re-transmitted. This determination is made based on the number of unsuccessful Tx attempts to transmit RLC SDU SNs 911 and 912, the level of importance of the RLC SDU SNs 911 and 912, or a combination of both. For example, if the number of unsuccessful Tx attempts satisfies a predetermined threshold, then the Tx device can determine that the RLC SDU SNs 911 and 912 are not to be retransmitted. Alternatively, or in addition, the Tx device an determine whether the level of importance for the RLC SDU SNs 911 and 912 satisfies a predetermined threshold. If the level of importance for the RLC SDU SNs 911 and 912 does not satisfy the predetermined threshold, then the RLC SDU SNs 911 and 912 may be determined to be not important and, therefore, not be re-transmitted.

In such a scenario and in accordance with the example of FIG. 9, the Tx device can repurpose the RLC SDU SNs 911 and 912 so that the RLC SDUs will be passed through and discarded. For example, the updated state RLC Tx buffer 920 shows that the RLC SDU SNs 911 and 912 have been repurposed as RLC SDU SNs 921 and 922. RLC SDU SNs 921 and 922 has had their respective payloads replaced with the payload of PDCP PDU 909 that is outside the transmission window 907 of the PDCP Tx buffer 905. Replacing the RLC SDU SNs 911 and 912 with the PDCP PDU 909 payload and sequence number 921a, 922a, respectively, results in the new RLC SDUs 921, 922 that has the PDCP PDU 809 payload and sequence number within the RLC SDU SNs 911, 912, respectively, and overriding the prior contents of RLC SDU SNs 911 and 912, while the RLC SDU SNs 921, 922 are still associated with the RLC SDU 911, 912 sequence numbers 3 and 4, respectively. These repurposed RLC SDU SNs 921, 922 can then be transmitted to the Rx device as a complete segment such as with RLC SDU 921 and 922's respective sequence numbers of 3 and 4, but filled the contents of PDCP PDU sequence number 2 909 instead of a less important, or outdated packets 911, 912 that was NACKed.

The Rx device can receive the repurposed RLC SDU SNs 3 and 4 921, 922 and acknowledge its receipt, as shown in the updated RLC Rx buffer 940. Upon acknowledgement of RLC SDU SNs 3, 4 941, 942, the Rx device can advance the receiving window 935 one or more RLS SDU SNs, as shown in 940. The Rx device can then provide the repurposed RLC SDU SNs 3, 4 941, 942 to the reordering function. The reordering function can then discard the RLC SDU SNs 3, 4 941, 942 at the PDCP Rx layer, as the RLC SDU SNs 3, 4 941, 942 were received outside of the receiving window 955 at slot 951 of the PDCP Rx buffer 950.

Accordingly, in such implementations, a PDCP PDU that was transmitted and RLC ACKed before but falls out of the PDCP Reordering window and therefore will be discarded on receiving PDCP entity's level as per 3GPP specification. In some implementations, the Tx RLC entity shall use the oldest known PDCP SN that was RLC ACKed. In this example, that PDCP SN is 2 as can be seen in FIG. 9, for example, as a result of PDCP_RX_DELIV-1.

The process described with reference to FIG. 9 provides multiple benefits including, for example, lower latency under bad radio conditions as only small (dummy) data is retransmitted, avoidance of RRC Reestablishments and data stall due for less important data, and could be standardized or proprietary operator/vendor agreement.

Figure 10:
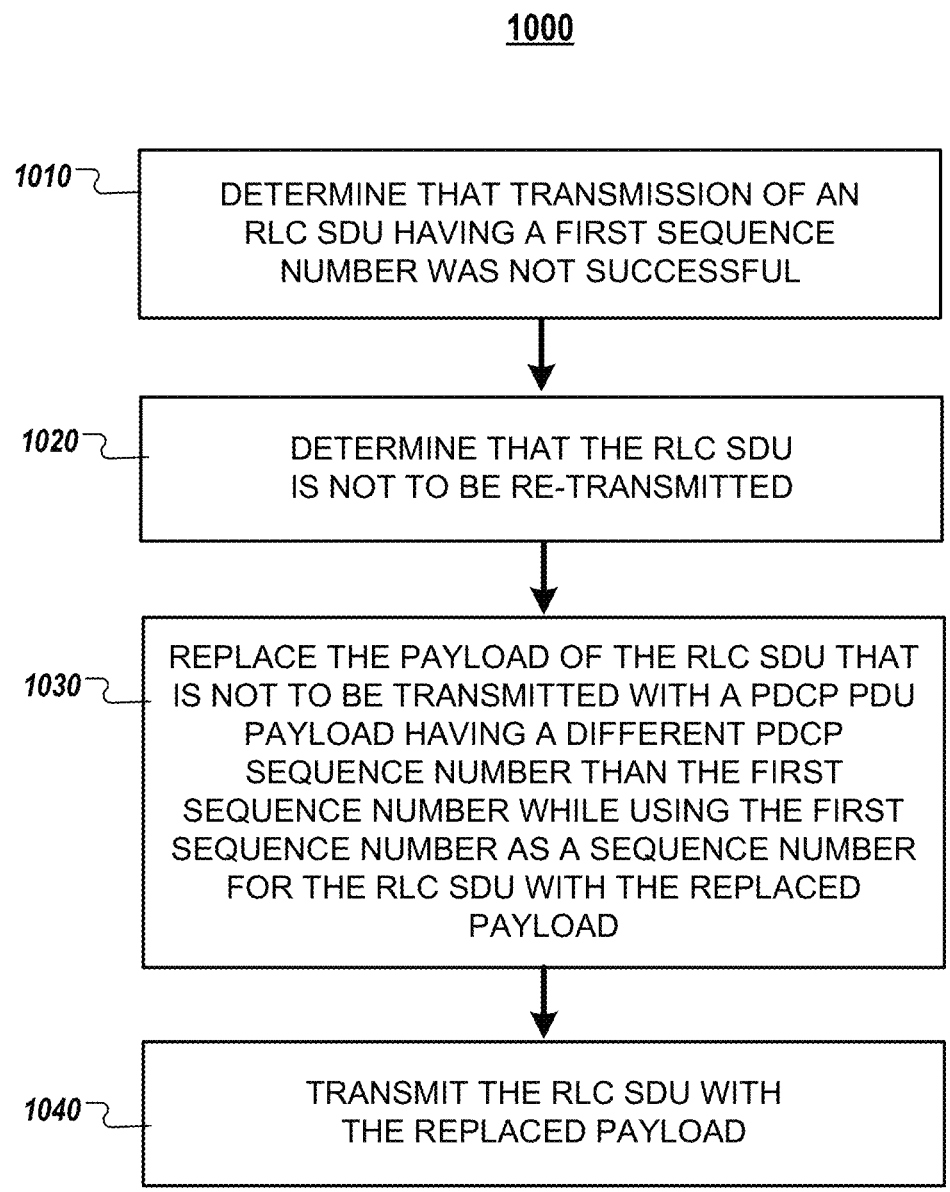
FIG. 10 is a flowchart of a process for re-purposing an RLC SDU that is to be otherwise skipped performed by a Tx device, in accordance with one aspect of the present disclosure.

FIG. 10 is a flowchart of a process 1000 for re-purposing an RLC SDU that is to be otherwise skipped performed by a Tx device, in accordance with one aspect of the present disclosure. The process 1000 will be described as being performed by a first device such as a UE 102 of FIG. 1. However, the process 1000 is not so limited and can also be performed by a different device such as a base station 104 of FIG. 1. It will be understood that process 1000 can be performed, for example, by any suitable system, environment, software, hardware, or a combination of systems, environments, software, and hardware, as appropriate. In some implementations, various steps of process 1000 can be run in parallel, in combination, in loops, or in any order.

A first device can begin execution of the process 1000 by determining that transmission of an RLC SDU having a first sequence number was not successful (1010).

The first device can continue execution of the process 1000 by determining that the RLC SDU is not to be re-transmitted (1020).

The first device can continue execution of the process 1000 by replacing the payload of the RLC SDU that is not to be transmitted with a PDCP PDU payload having a different PDCP sequence number than the first PDCP sequence number while using the first sequence number (1030). In some implementations, the first devices execution of stage 1030 can include the first device replacing the payload of the RLC SDU with the PDCP PDU payload forms a new RLC SDU to be transmitted, with the first sequence number and mapping to the new PDCP SN, that replaces any previously transmitted and stored RLC segments in the RLC SDU.

The first device can continue execution of the process 1000 by transmitting the RLC SDU with the replaced payload to second device (1040). In some implementations, the first device is a UE and the second device is a base station. In other implementations, the first device is a base station and the second device is a UE.

In some implementations, the PDCP PDU payload is a next PDCP PDU that is to be transmitted within a PDCP PDU transmission window.

In some implementations, the PDCP PDU payload is a payload of a PDCP PDU that is outside of a PDCP PDU transmission window.

In some implementations, the PDCP PDU that is outside the PDCP PDU transmission window corresponds to an RLC SDU that (i) was previously transmitted and acknowledged and (ii) falls outside of PDCP reordering window.

In some implementations, the PDCP PDU that is outside the PDCP PDU that was previously transmitted and acknowledged is the PDCP PDU that corresponds to an RLC SDU that was previously transmitted and acknowledged.

Figure 11A:
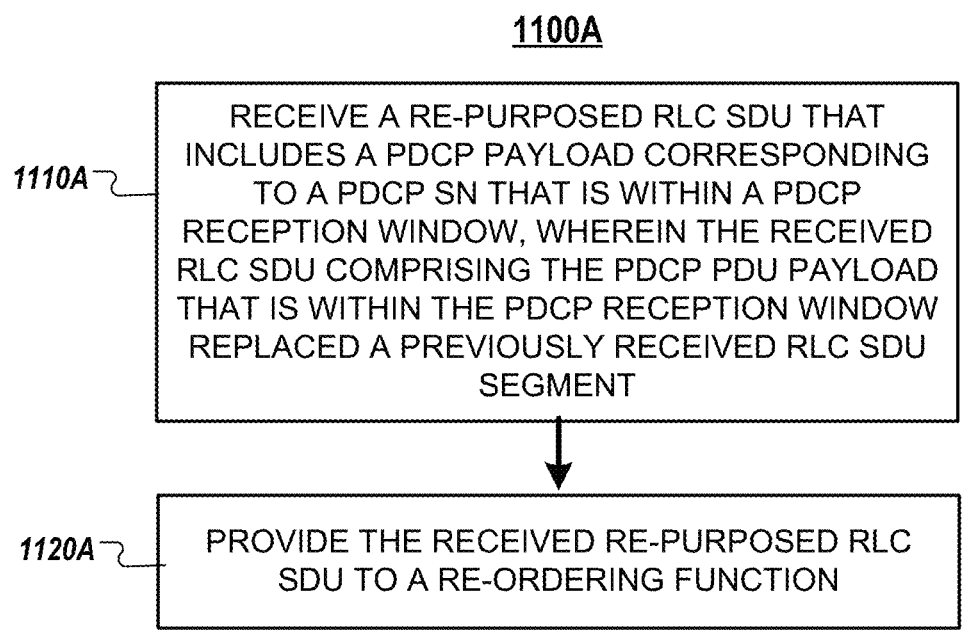
FIG. 11A is a flowchart of a process for re-purposing an RLC SDU that is to be otherwise skipped performed by an Rx device, in accordance with one aspect of the present disclosure.

FIG. 11A is a flowchart of a process 1100A for re-purposing an RLC SDU that is to be otherwise skipped performed by an Rx device, in accordance with one aspect of the present disclosure. The process 1100A will be described as being performed by a first device such as a UE 102 of FIG. 1. However, the process 1100A is not so limited and can also be performed by a different device such as a base station 104 of FIG. 1. It will be understood that process 1100A can be performed, for example, by any suitable system, environment, software, hardware, or a combination of systems, environments, software, and hardware, as appropriate. In some implementations, various steps of process 1100A can be run in parallel, in combination, in loops, or in any order.

A first device can continue execution of the process 1100A by receiving a re-purposed RLC SDU that includes a PDCP payload corresponding to a PDCP SN that is within a PDCP reception window, wherein the received RLC SDU comprising the PDCP PDU payload that is within the PDCP reception window replaced a previously received RLC SDU segment (1110A). In some implementations, the re-purposed RLC SDU can be received from a second device. In some implementations, the first device is a UE and the second device is a base station. In other implementations, the first device is a base station and the second device is a UE.

The first device can continue execution of the process 1100A by providing the received re-purposed RLC SDU to a re-ordering function (1120A). In some implementations, the re-ordering function is implemented at the PDCP layer. In other implementations, the re-ordering function is implemented at the RLC layer.

In some implementations, the first device can continue execution of the process 1100A by providing the received re-purposed RLC SDU to the re-ordering function informs the re-ordering function of one or more gaps in PDCP PDUs.

In some implementations, the first device can continue execution of the process 1100A by providing the received re-purposed RLC SDU to the re-ordering function causes the re-ordering window to be updated.

Figure 11B:
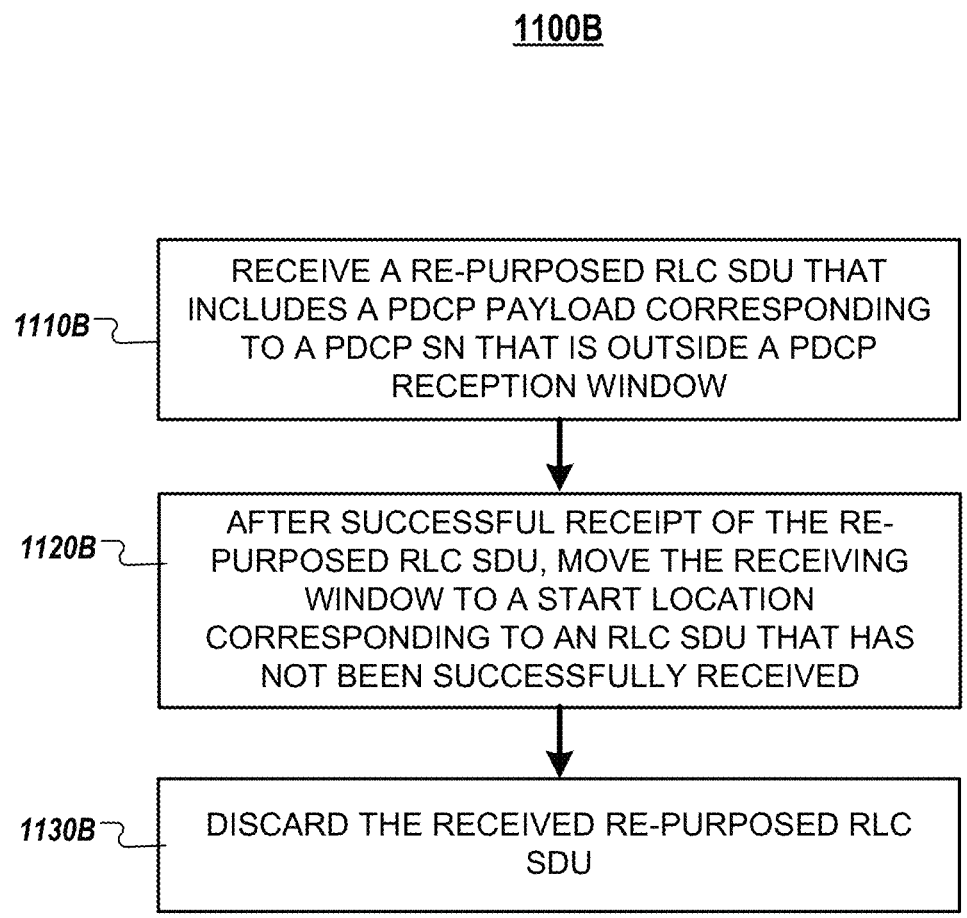
FIG. 11B is a flowchart of another process for re-purposing an RLC SDU that is to be otherwise skipped performed by an Rx device, in accordance with one aspect of the present disclosure.

FIG. 11B is a flowchart of another process 1100B for re-purposing an RLC SDU that is to be otherwise skipped performed by an Rx device, in accordance with one aspect of the present disclosure. The process 1100B will be described as being performed by a first device such as a UE 102 of FIG. 1. However, the process 1100B is not so limited and can also be performed by a different device such as a base station 104 of FIG. 1. It will be understood that process 1100B can be performed, for example, by any suitable system, environment, software, hardware, or a combination of systems, environments, software, and hardware, as appropriate. In some implementations, various steps of process 1100B can be run in parallel, in combination, in loops, or in any order.

A first device can being execution of the process 1100B by receiving a re-purposed RLC SDU that includes a PDCP payload corresponding to a PDCP SN that is outside of a PDCP reception window (1110B). In some implementations, the re-purposed RLC SDU can be received from a second device. In some implementations, the first device is a UE and the second device is a base station. In other implementations, the first device is a base station and the second device is a UE After successful receipt of the re-purposed RLC SDU, the first device can continue execution of the process 1100B by moving the receiving window to a start location corresponding to the next RLC SDU location corresponding to an RLC SDU that has not been successfully received (1120B).

The first device can continue execution of the process 1100B by discarding the received re-purposed RLC SDU (1130B).

Figure 12:
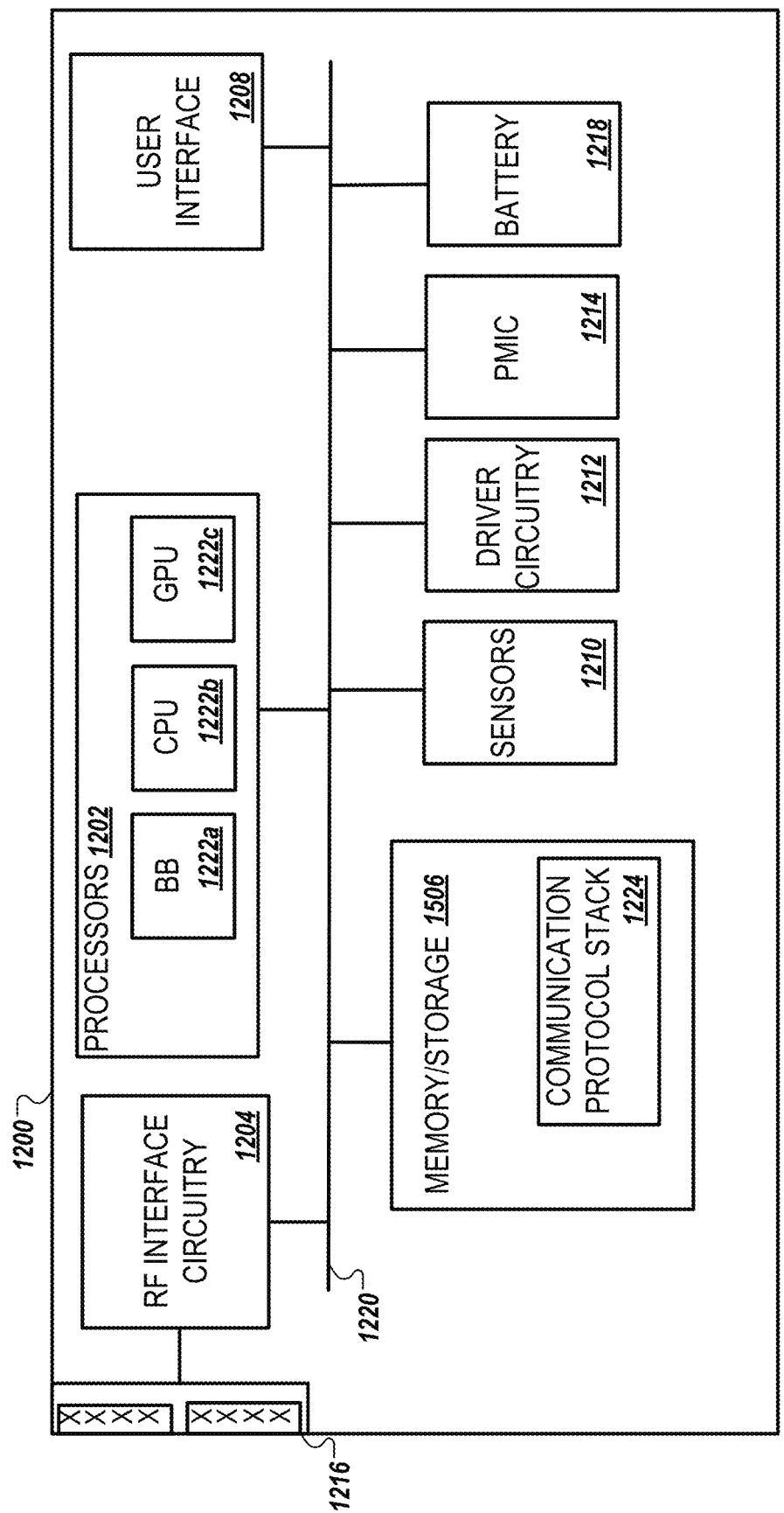
FIG. 12 illustrates a user equipment (UE), according to some implementations.

FIG. 12 illustrates a user equipment (UE) 1200, according to some implementations. The UE 1200 may be similar to and substantially interchangeable with UE 102 of FIG. 1.

The UE 1200 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1200 may include processors 1202, RF interface circuitry 1204, memory/storage 1206, user interface 1208, sensors 1210, driver circuitry 1212, power management integrated circuit (PMIC) 1214, antenna structure 1216, and battery 1218. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1220, which may represent any type of interface, input/output, bus (local, system, or expansion), transmission line, trace, optical connection, etc. that allows various circuit components (on common or different chips or chipsets) to interact with one another.

The processors 1202 may include processor circuitry such as, for example, baseband processor circuitry (BB) 1222A, central processor unit circuitry (CPU) 1222n, and graphics processor unit circuitry (GPU) 1222C. The processors 1202 may include any type of circuitry or processor circuitry that executes or otherwise operates computer-executable instructions, such as program code, software modules, or functional processes from memory/storage 1206 to cause the UE 1200 to perform operations as described herein.

In some implementations, the baseband processor circuitry 1222A may access a communication protocol stack 1224 in the memory/storage 1206 to communicate over a 3GPP compatible network. In general, the baseband processor circuitry 1222A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1204. The baseband processor circuitry 1222A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1206 may include one or more non-transitory, computer-readable media that includes instructions (for example, communication protocol stack 1224) that may be executed by one or more of the processors 1202 to cause the UE 1200 to perform various operations described herein. The memory/storage 1206 include any type of volatile or non-volatile memory that may be distributed throughout the UE 1200. In some implementations, some of the memory/storage 1206 may be located on the processors 1202 themselves (for example, L1 and L2 cache), while other memory/storage 1206 is external to the processors 1202 but accessible thereto via a memory interface. The memory/storage 1206 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1204 may include transceiver circuitry and radio frequency front module (RFEM) that allows the UE 1200 to communicate with other devices over a radio access network. The RF interface circuitry 1204 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1216 and proceed to filter and amplify (with a low-noise amplifier) the signal. The signal may be provided to a receiver of the transceiver that downconverts the RF signal into a baseband signal that is provided to the baseband processor of the processors 1202.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1216. In various implementations, the RF interface circuitry 1204 may be configured to transmit/receive signals in a manner compatible with NR access technologies.

The antenna 1216 may include antenna elements to convert electrical signals into radio waves to travel through the air and to convert received radio waves into electrical signals. The antenna elements may be arranged into one or more antenna panels. The antenna 1216 may have antenna panels that are omnidirectional, directional, or a combination thereof to enable beamforming and multiple input, multiple output communications. The antenna 1216 may include microstrip antennas, printed antennas fabricated on the surface of one or more printed circuit boards, patch antennas, phased array antennas, etc. The antenna 1216 may have one or more panels designed for specific frequency bands including bands in FR1 or FR2.

The user interface 1208 includes various input/output (I/O) devices designed to enable user interaction with the UE 1200. The user interface 1208 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1200.

The sensors 1210 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1212 may include software and hardware elements that operate to control particular devices that are embedded in the UE 1200, attached to the UE 1200, or otherwise communicatively coupled with the UE 1200. The driver circuitry 1212 may include individual drivers allowing other components to interact with or control various input/output (I/O) devices that may be present within, or connected to, the UE 1200. For example, driver circuitry 1212 may include a display driver to control and allow access to a display device, a touchscreen driver to control and allow access to a touchscreen interface, sensor drivers to obtain sensor readings of sensor circuitry 1210 and control and allow access to sensor circuitry 1210, drivers to obtain actuator positions of electro-mechanic components or control and allow access to the electro-mechanic components, a camera driver to control and allow access to an embedded image capture device, audio drivers to control and allow access to one or more audio devices.

The PMIC 1214 may manage power provided to various components of the UE 1200. In particular, with respect to the processors 1202, the PMIC 1214 may control power-source selection, voltage scaling, battery charging, or DC-to-DC conversion.

In some implementations, the PMIC 1214 may control, or otherwise be part of, various power saving mechanisms of the UE 1200. A battery 1218 may power the UE 1200, although in some examples the UE 1200 may be mounted deployed in a fixed location, and may have a power supply coupled to an electrical grid. The battery 1218 may be a lithium ion battery, a metal-air battery, such as a zinc-air battery, an aluminum-air battery, a lithium-air battery, and the like. In some implementations, such as in vehicle-based applications, the battery 1218 may be a typical lead-acid automotive battery.

Figure 13:
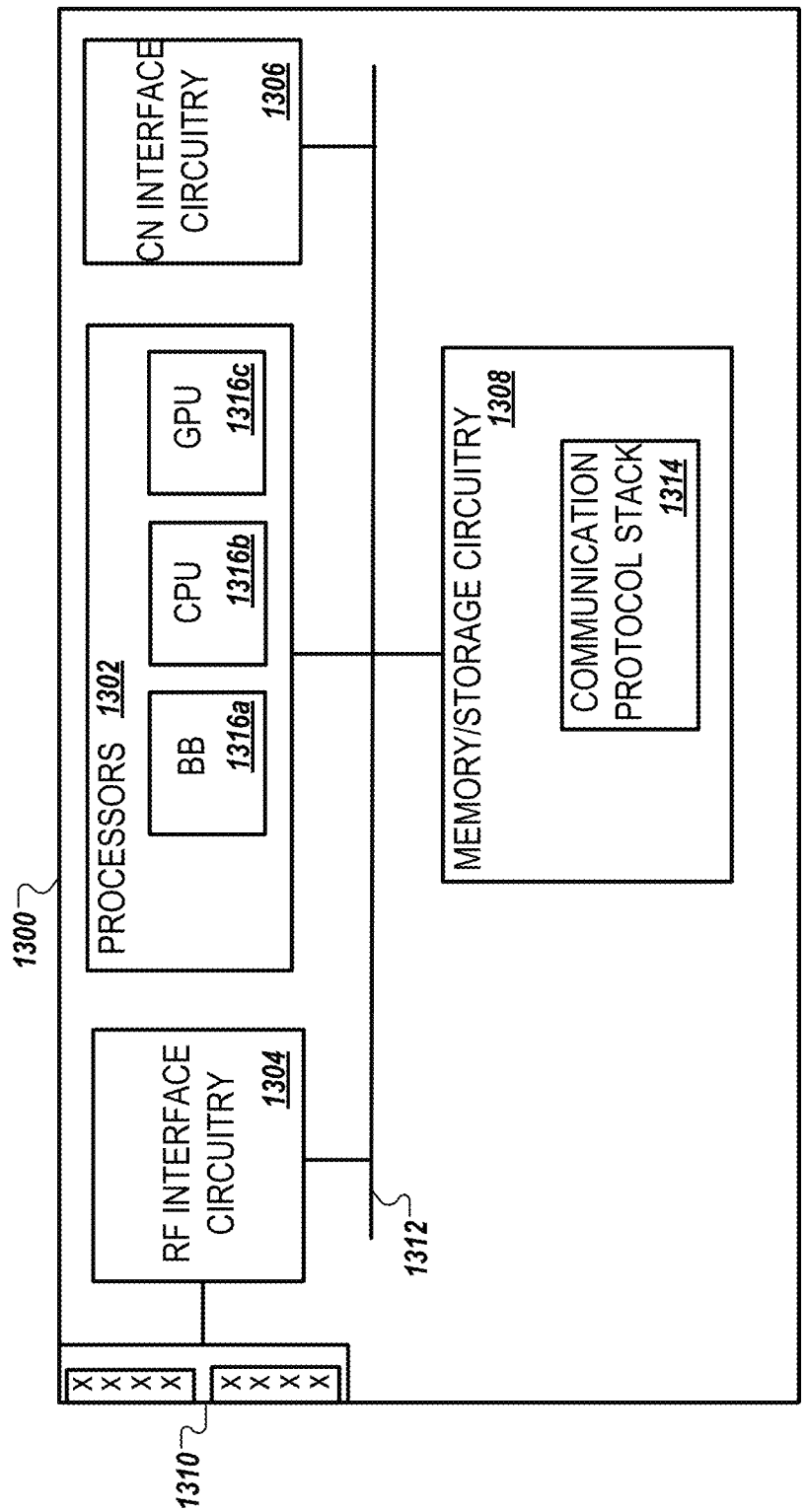
FIG. 13 illustrates an access node, according to some implementations.

FIG. 13 illustrates an access node 1300 (e.g., a base station or gNB), according to some implementations. The access node 1300 may be similar to and substantially interchangeable with base station 104. The access node 1300 may include processors 1302, RF interface circuitry 1304, core network (CN) interface circuitry 1306, memory/storage circuitry 1308, and antenna structure 1310.

The components of the access node 1300 may be coupled with various other components over one or more interconnects 1312. The processors 1302, RF interface circuitry 1304, memory/storage circuitry 1308 (including communication protocol stack 1314), antenna structure 1310, and interconnects 1312 may be similar to like-named elements shown and described with respect to FIG. 12. For example, the processors 1302 may include processor circuitry such as, for example, baseband processor circuitry (BB) 1316A, central processor unit circuitry (CPU) 1316B, and graphics processor unit circuitry (GPU) 1316C.

The CN interface circuitry 1306 may provide connectivity to a core network, for example, a 5th Generation Core network (5GC) using a 5GC-compatible network interface protocol such as carrier Ethernet protocols, or some other suitable protocol. Network connectivity may be provided to/from the access node 1300 via a fiber optic or wireless backhaul. The CN interface circuitry 1306 may include one or more dedicated processors or FPGAs to communicate using one or more of the aforementioned protocols. In some implementations, the CN interface circuitry 1306 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1300 that operates in an NR or 5G system (for example, a gNB), and the term "E-UTRAN node" or the like may refer to an access node 1300 that operates in an LTE or 4G system (e.g., an eNB). According to various implementations, the access node 1300 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1300 may be implemented as one or more software entities running on server computers as part of a virtual network, which may be referred to as a CRAN and/or a virtual baseband unit pool (vBBUP). In V2X scenarios, the access node 1300 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

A. EXAMPLES

In the following sections, further exemplary embodiments are provided.

First Example

Example 1 may include a method for selective re-transmission of radio link channel (RLC) service data units (SDUs) that involves determining that transmission of an RLC SDU having a first sequence number was not successful; determining whether to re-transmit the RLC SDU; and based on a determination that the particular RLC SDU is not to be re-transmitted: moving a start location of an RLC transmission window to an RLC SDU that (i) has a sequence number that is greater than the first sequence number and (ii) has not been acknowledged; and transmitting a transmission to another device that indicates that the RLC SDU having the first sequence number is to be skipped.

Example 2 may include the method of Example 1 where determining whether to re-transmit the RLC SDU involves: determining a level of importance of the RLC SDU based on higher layer information associated with the RLC SDU; and determining whether to re-transmit the RLC SDU based on the determined level of importance of the RLC SDU.

Example 3 may include the method of any of Examples 1-2 where the higher layer information associated with the RLC SDU is a type of IP packet from which the RLC SDU is derived.

Example 4 may include the method of any of Examples 1-3 where wherein the higher layer information associated with the RLC SDU is an importance value assigned, by an application, to an IP packet from which the RLC SDU is derived.

Example 5 may include the method of any of Examples 1-4 where determining whether to re-transmit the RLC SDU based on the determined level of importance of the RLC SDU involves based on a determination that the level of importance does not satisfy a predetermined threshold, determining that the RLC SDU is not to be re-transmitted.

Example 6 may include the method of any of Examples 1-5 where determining whether to re-transmit the RLC SDU based on the determined level of importance of the RLC SDU involves based on a determination that the level of importance satisfies a predetermined threshold, determining that the RLC SDU is to be re-transmitted.

Example 7 may include the method of any of Examples 1-6 and further involving re-transmitting, by the first device, the RLC SDU.

Example 8 may include the method of any of Examples 1-7 where determining whether to re-transmit the RLC SDU involves determining a number of times the RLC SDU has been unsuccessfully transmitted.

Example 9 may include the method of any of Examples 1-8 and further involving based on a determination that the determined number of unsuccessful transmissions does not satisfy a predetermined threshold, determining that the RLC SDU is to be re-transmitted.

Example 10 may include the method of any of Examples 1-9 and further involving re-transmitting the RLC SDU.

Example 11 may include the method of any of Examples 1-10 and further involving based on a determination that the determined number of unsuccessful transmissions satisfies a predetermined threshold, determining that the RLC SDU is not to be re-transmitted.

Example 12 may include the method of any of Examples 1-11 and further involving generating an RLC PDU having a sequence number that corresponds to the first sequence number and a payload size of zero; and wherein transmitting a transmission to a second device that indicates that the RLC SDU having the first sequence number is to be skipped involves transmitting the generated RLC PDU having a payload size of zero to the second device.

Example 13 may include the method of any of Examples 1-12 and where the transmission involves an RLC Control PDU indicating a new RX_NEXT location for advancing the RLC receiving window used by the other device.

Example 14 may include the method of any of Examples 1-13 and where the new RX_Next location is the new start location of the RLC receiving window used by the other device.

Example 15 may include the method of any of Examples 1-14 and where the transmission comprises an RLC Control PDU indicating the first sequence number of the RLC SDU that is to be skipped.

Example 16 may include one or more non-transitory computer-readable media including instructions to cause an electronic device, upon execution of the instructions by one or more processors of the electronic device, to perform one or more elements of a method described in or related to any of examples 1-15, or any other method or process described herein.

Example 17 may include an apparatus including logic, modules, or circuitry to perform one or more elements of a method described in or related to any of examples 1-15, or any other method or process described herein.

Example 18 may include a method, technique, or process as described in or related to any of examples 1-15, or portions or parts thereof.

Example 19 may include an apparatus including: one or more processors and one or more computer-readable media including instructions that, when executed by the one or more processors, cause the one or more processors to perform the method, techniques, or process as described in or related to any of examples 1-15, or portions thereof.

Example 20 may include a signal as described in or related to any of examples 1-15, or portions or parts thereof.

Example 21 may include a datagram, information element, packet, frame, segment, PDU, or message as described in or related to any of examples 1-15, or portions or parts thereof, or otherwise described in the present disclosure.

Example 22 may include a signal encoded with data as described in or related to any of examples 1-15, or portions or parts thereof, or otherwise described in the present disclosure.

Example 23 may include a signal encoded with a datagram, IE, packet, frame, segment, PDU, or message as described in or related to any of examples 1-15, or portions or parts thereof, or otherwise described in the present disclosure.

Example 24 may include an electromagnetic signal carrying computer-readable instructions, wherein execution of the computer-readable instructions by one or more processors is to cause the one or more processors to perform the method, techniques, or process as described in or related to any of examples 1-15, or portions thereof.

Example 25 may include a computer program including instructions, wherein execution of the program by a processing element is to cause the processing element to carry out the method, techniques, or process as described in or related to any of examples 1-15, or portions thereof. The operations or actions performed by the instructions executed by the processing element can include the methods of any one of examples 1-15.

Example 26 may include a signal in a wireless network as shown and described herein.

Example 27 may include a method of communicating in a wireless network as shown and described herein.

Example 28 may include a system for providing wireless communication as shown and described herein. The operations or actions performed by the system can include the methods of any one of examples 1-15.

Example 29 may include a device for providing wireless communication as shown and described herein. The operations or actions performed by the device can include the methods of any one of examples 1-15.

The previously-described examples 1-15 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Second Example

Example 30 may include a method for selectively moving a receiving window for radio link channel (RLC) service data units (SDUs), the method involving: receiving a transmission, from a device, that indicates that an RLC SDU having a first sequence number that is to be skipped; and moving a start location of a receiving window to an RLC SDU that (i) has a sequence number that is greater than the first sequence number and (ii) has not been received.

Example 31 may include the method of Examples 30 and further involving instructing a reordering function running on the first device that a PDU corresponding to the first sequence number is to be skipped.

Example 32 may include the method of any of Examples 30-31 and further involving moving a start location of a reordering window to a PDU that (i) has a sequence number that is greater than the first sequence number and (ii) has not been received.

Example 33 may include the method of any of Examples 30-32 wherein the reordering window is a PDCP reordering window.

Example 34 may include the method of any of Examples 30-33 wherein the received transmission that indicates that an RLC SDU having a first sequence number that is to be skipped comprises an RLC Control PDU that includes a start location for the receiving window.

Example 35 may include the method of any of Examples 30-34 wherein the received transmission, from the device, that indicates that an RLC SDU having a first sequence number that is to be skipped comprises an RLC Control PDU that includes the first sequence number that is to be skipped.

Example 36 may include the method of any of Examples 30-35 wherein the received transmission, from the device, that indicates that an RLC SDU having a first sequence number that is to be skipped comprises an RLC PDU having a sequence number that corresponds to the first sequence number and a payload size of zero.

Example 37 may include one or more non-transitory computer-readable media including instructions to cause an electronic device, upon execution of the instructions by one or more processors of the electronic device, to perform one or more elements of a method described in or related to any of examples 30-36, or any other method or process described herein.

Example 38 may include an apparatus including logic, modules, or circuitry to perform one or more elements of a method described in or related to any of examples 30-36, or any other method or process described herein.

Example 39 may include a method, technique, or process as described in or related to any of examples 30-36, or portions or parts thereof.

Example 40 may include an apparatus including: one or more processors and one or more computer-readable media including instructions that, when executed by the one or more processors, cause the one or more processors to perform the method, techniques, or process as described in or related to any of examples 30-36, or portions thereof.

Example 41 may include a signal as described in or related to any of examples 30-36, or portions or parts thereof.

Example 42 may include a datagram, information element, packet, frame, segment, PDU, or message as described in or related to any of examples 30-36, or portions or parts thereof, or otherwise described in the present disclosure.

Example 43 may include a signal encoded with data as described in or related to any of examples 30-36, or portions or parts thereof, or otherwise described in the present disclosure.

Example 44 may include a signal encoded with a datagram, IE, packet, frame, segment, PDU, or message as described in or related to any of examples 30-36, or portions or parts thereof, or otherwise described in the present disclosure.

Example 45 may include an electromagnetic signal carrying computer-readable instructions, wherein execution of the computer-readable instructions by one or more processors is to cause the one or more processors to perform the method, techniques, or process as described in or related to any of examples 30-36, or portions thereof.

Example 46 may include a computer program including instructions, wherein execution of the program by a processing element is to cause the processing element to carry out the method, techniques, or process as described in or related to any of examples 30-36, or portions thereof. The operations or actions performed by the instructions executed by the processing element can include the methods of any one of examples 30-36.

Example 47 may include a signal in a wireless network as shown and described herein.

Example 48 may include a method of communicating in a wireless network as shown and described herein.

Example 49 may include a system for providing wireless communication as shown and described herein. The operations or actions performed by the system can include the methods of any one of examples 30-36.

Example 50 may include a device for providing wireless communication as shown and described herein. The operations or actions performed by the device can include the methods of any one of examples 30-36.

The previously-described examples 30-36 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Third Example

Example 51 may include a method for repurposing an RLC SDU that is to be transmitted, the method involving determining that transmission of an RLC SDU having a first sequence number was not successful; determining that the RLC SDU is not to be re-transmitted; replacing the payload of the RLC SDU that is not to be transmitted with a PDCP PDU payload having a different PDCP sequence number than the first PDCP sequence number while using the first sequence number; and transmitting the RLC SDU with the replaced payload.

Example 52 may include the method of Example 51 wherein the PDCP PDU payload is a next PDCP PDU that is to be transmitted within a PDCP PDU transmission window.

Example 53 may include the method of any of Examples 51-52 and further involve replacing the payload of the RLC SDU with the PDCP PDU payload forms a new RLC SDU to be transmitted, with the first sequence number and mapping to the new PDCP SN, that replaces any previously transmitted and stored RLC segments in the RLC SDU.

Example 54 may include the method of any of Examples 51-53 where the PDCP PDU payload is a payload of a PDCP PDU that is outside of a PDCP PDU transmission window.

Example 55 may include the method of any of Examples 51-54 where the PDCP PDU that is outside the PDCP PDU transmission window corresponds to an RLC SDU that (i) was previously transmitted and acknowledged and (ii) falls outside of PDCP reordering window.

Example 56 may include the method of any of Examples 51-55 where the PDCP PDU that is outside the PDCP PDU that was previously transmitted and acknowledged is the PDCP PDU that corresponds to an RLC SDU that was previously transmitted and acknowledged.

Example 57 may include one or more non-transitory computer-readable media including instructions to cause an electronic device, upon execution of the instructions by one or more processors of the electronic device, to perform one or more elements of a method described in or related to any of examples 51-55, or any other method or process described herein.

Example 58 may include an apparatus including logic, modules, or circuitry to perform one or more elements of a method described in or related to any of examples 51-55, or any other method or process described herein.

Example 59 may include a method, technique, or process as described in or related to any of examples 51-55, or portions or parts thereof.

Example 60 may include an apparatus including: one or more processors and one or more computer-readable media including instructions that, when executed by the one or more processors, cause the one or more processors to perform the method, techniques, or process as described in or related to any of examples 51-55, or portions thereof.

Example 61 may include a signal as described in or related to any of examples 51-55, or portions or parts thereof.

Example 62 may include a datagram, information element, packet, frame, segment, PDU, or message as described in or related to any of examples 51-55, or portions or parts thereof, or otherwise described in the present disclosure.

Example 63 may include a signal encoded with data as described in or related to any of examples 51-55, or portions or parts thereof, or otherwise described in the present disclosure.

Example 64 may include a signal encoded with a datagram, IE, packet, frame, segment, PDU, or message as described in or related to any of examples 51-55, or portions or parts thereof, or otherwise described in the present disclosure.

Example 65 may include an electromagnetic signal carrying computer-readable instructions, wherein execution of the computer-readable instructions by one or more processors is to cause the one or more processors to perform the method, techniques, or process as described in or related to any of examples 51-55, or portions thereof.

Example 66 may include a computer program including instructions, wherein execution of the program by a processing element is to cause the processing element to carry out the method, techniques, or process as described in or related to any of examples 51-55, or portions thereof. The operations or actions performed by the instructions executed by the processing element can include the methods of any one of examples 51-55.

Example 67 may include a signal in a wireless network as shown and described herein.

Example 68 may include a method of communicating in a wireless network as shown and described herein.

Example 69 may include a system for providing wireless communication as shown and described herein. The operations or actions performed by the system can include the methods of any one of examples 51-55.

Example 70 may include a device for providing wireless communication as shown and described herein. The operations or actions performed by the device can include the methods of any one of examples 51-55.

The previously-described examples 51-55 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Fourth Example

Example 71 may include a method for receiving a re-purposed RLC SDU involving receiving a re-purposed RLC SDU that includes a PDCP payload corresponding to a PDCP SN that is within a PDCP reception window, wherein the received RLC SDU comprising the PDCP PDU payload that is within the PDCP reception window replaced a previously received RLC SDU segment; and providing the received re-purposed RLC SDU to a re-ordering function.

Example 72 may include the method of Example 71 where the re-ordering function is implemented at the PDCP layer.

Example 73 may include the method of any of Examples 71-72 where the re-ordering function is implemented at the RLC layer.

Example 74 may include the method of any of Examples 71-73 where providing the received re-purposed RLC SDU to the re-ordering function informs the re-ordering function of one or more gaps in PDCP PDUs.

Example 75 may include the method of any of Examples 71-74 where providing the received re-purposed RLC SDU to the re-ordering function causes the re-ordering window to be updated.

Example 76 may include one or more non-transitory computer-readable media including instructions to cause an electronic device, upon execution of the instructions by one or more processors of the electronic device, to perform one or more elements of a method described in or related to any of examples 71-75, or any other method or process described herein.

Example 77 may include an apparatus including logic, modules, or circuitry to perform one or more elements of a method described in or related to any of examples 71-75, or any other method or process described herein.

Example 78 may include a method, technique, or process as described in or related to any of examples 71-75, or portions or parts thereof.

Example 79 may include an apparatus including: one or more processors and one or more computer-readable media including instructions that, when executed by the one or more processors, cause the one or more processors to perform the method, techniques, or process as described in or related to any of examples 71-75, or portions thereof.

Example 80 may include a signal as described in or related to any of examples 71-75, or portions or parts thereof.

Example 81 may include a datagram, information element, packet, frame, segment, PDU, or message as described in or related to any of examples 71-75, or portions or parts thereof, or otherwise described in the present disclosure.

Example 82 may include a signal encoded with data as described in or related to any of examples 71-75, or portions or parts thereof, or otherwise described in the present disclosure.

Example 83 may include a signal encoded with a datagram, IE, packet, frame, segment, PDU, or message as described in or related to any of examples 71-75, or portions or parts thereof, or otherwise described in the present disclosure.

Example 84 may include an electromagnetic signal carrying computer-readable instructions, wherein execution of the computer-readable instructions by one or more processors is to cause the one or more processors to perform the method, techniques, or process as described in or related to any of examples 71-75, or portions thereof.

Example 85 may include a computer program including instructions, wherein execution of the program by a processing element is to cause the processing element to carry out the method, techniques, or process as described in or related to any of examples 71-75, or portions thereof. The operations or actions performed by the instructions executed by the processing element can include the methods of any one of examples 71-75.

Example 86 may include a signal in a wireless network as shown and described herein.

Example 87 may include a method of communicating in a wireless network as shown and described herein.

Example 88 may include a system for providing wireless communication as shown and described herein. The operations or actions performed by the system can include the methods of any one of examples 71-75.

Example 89 may include a device for providing wireless communication as shown and described herein. The operations or actions performed by the device can include the methods of any one of examples 71-75.

The previously-described examples 71-75 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Fifth Example

Example 90 may include a method for receiving a re-purposed RLC SDU involving receiving a re-purposed RLC SDU that includes a PDCP payload corresponding to a PDCP SN that is outside of a PDCP reception window; after successful receipt of the re-purposed RLC SDU, moving the receiving window to a start location corresponding to the next RLC SDU location corresponding to an RLC SDU that has not been successfully received; and discarding the received re-purposed RLC SDU.

Example 91 may include one or more non-transitory computer-readable media including instructions to cause an electronic device, upon execution of the instructions by one or more processors of the electronic device, to perform one or more elements of a method described in or related to example 90, or any other method or process described herein.

Example 92 may include an apparatus including logic, modules, or circuitry to perform one or more elements of a method described in or related to example 90, or any other method or process described herein.

Example 93 may include a method, technique, or process as described in or related example 90, or portions or parts thereof.

Example 94 may include an apparatus including: one or more processors and one or more computer-readable media including instructions that, when executed by the one or more processors, cause the one or more processors to perform the method, techniques, or process as described in or related example 90, or portions thereof.

Example 95 may include a signal as described in or related example 90, or portions or parts thereof.

Example 96 may include a datagram, information element, packet, frame, segment, PDU, or message as described in or related example 90, or portions or parts thereof, or otherwise described in the present disclosure.

Example 97 may include a signal encoded with data as described in or example 90, or portions or parts thereof, or otherwise described in the present disclosure.

Example 98 may include a signal encoded with a datagram, IE, packet, frame, segment, PDU, or message as described in or related example 90, or portions or parts thereof, or otherwise described in the present disclosure.

Example 99 may include an electromagnetic signal carrying computer-readable instructions, wherein execution of the computer-readable instructions by one or more processors is to cause the one or more processors to perform the method, techniques, or process as described in or related to any of examples 1-XXA, or portions thereof.

Example 100 may include a computer program including instructions, wherein execution of the program by a processing element is to cause the processing element to carry out the method, techniques, or process as described in or related example 90, or portions thereof. The operations or actions performed by the instructions executed by the processing element can include the method of example 90.

Example 101 may include a signal in a wireless network as shown and described herein.

Example 102 may include a method of communicating in a wireless network as shown and described herein.

Example 103 may include a system for providing wireless communication as shown and described herein. The operations or actions performed by the system can include the method of Example 90.

Example 104 may include a device for providing wireless communication as shown and described herein. The operations or actions performed by the device can include the method of Example 90.

The previously-described example 90 is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-15, 30-36, 51-55, 71-75, or 90.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
    determining that transmission of a radio link channel (RLC) service data unit (SDU) having a first sequence number was not successful; and
    based on a determination that the RLC SDU is not to be re-transmitted:
        moving a start location of an RLC transmission window to an RLC SDU that (i) has a sequence number greater than the first sequence number and (ii) has not been acknowledged;
        generating an RLC protocol data unit (PDU) with (i) a sequence number that corresponds to the first sequence number and (ii) a payload size of zero; and
        sending the generated RLC PDU to another device to indicate that the RLC SDU having the first sequence number is to be skipped.

2. The method of claim 1, wherein determining whether to re-transmit the RLC SDU comprises:
    determining a level of importance of the RLC SDU based on higher layer information associated with the RLC SDU; and
    determining whether to re-transmit the RLC SDU based on the determined level of importance of the RLC SDU.

3. The method of claim 2, wherein the higher layer information associated with the RLC SDU is a type of IP packet from which the RLC SDU is derived.

4. The method of claim 2, wherein the higher layer information associated with the RLC SDU is an importance value assigned, by an application, to an IP packet from which the RLC SDU is derived.

5. The method of claim 2, determining whether to re-transmit the RLC SDU based on the determined level of importance of the RLC SDU comprises:
    based on a determination that the level of importance does not satisfy a predetermined threshold, determining that the RLC SDU is not to be re-transmitted.

6. The method of claim 2, determining whether to re-transmit the RLC SDU based on the determined level of importance of the RLC SDU comprises:
    based on a determination that the level of importance satisfies a predetermined threshold, determining that the RLC SDU is to be re-transmitted.

7. The method of claim 6, the method further comprising: re-transmitting the RLC SDU.

8. The method of claim 1, wherein determining whether to re-transmit the RLC SDU comprises:
    determining a number of times the RLC SDU has been unsuccessfully transmitted.

9. The method of claim 8, the method further comprising:
    based on a determination that the determined number of unsuccessful transmissions does not satisfy a predetermined threshold, determining that the RLC SDU is to be re-transmitted.

10. The method of claim 9, the method further comprising:
    re-transmitting the RLC SDU.

11. The method of claim 8, the method further comprising:
    based on a determination that the determined number of unsuccessful transmissions satisfies a predetermined threshold, determining that the RLC SDU is not to be re-transmitted.

12. The method of claim 1, wherein the transmission comprises an RLC Control PDU indicating a new RX_NEXT location for advancing the RLC receiving window used by the other device, wherein the new RX_Next location is the start location of the RLC receiving window used by the other device.

13. The method of claim 1, wherein the transmission comprises an RLC Control PDU indicating the first sequence number of the RLC SDU that is to be skipped.

14. One or more processors configured to perform operations comprising:
 determining that transmission of an RLC SDU having a first sequence number was not successful;
 based on a determination that the RLC SDU is not to be re-transmitted:
  moving a start location of an RLC transmission window to an RLC SDU that (i) has a sequence number greater than the first sequence number and (ii) has not been acknowledged;
  generating an RLC protocol data unit (PDU) with (i) a sequence number that corresponds to the first sequence number and (ii) a payload size of zero; and
  sending the generated RLC PDU to another device to indicate that the RLC SDU having the first sequence number is to be skipped.

15. An electronic device comprising:
 one or more processors; and
 one or more memory devices storing instructions that, when executed, cause the one or more processors to perform operations comprising:
 determining that transmission of an RLC SDU having a first sequence number was not successful;
 based on a determination that the RLC SDU is not to be re-transmitted:
  moving a start location of an RLC transmission window to an RLC SDU that (i) has a sequence number greater than the first sequence number and (ii) has not been acknowledged;
  generating an RLC protocol data unit (PDU) with (i) a sequence number that corresponds to the first sequence number and (ii) a payload size of zero; and
  sending the generated RLC PDU to another device to indicate that the RLC SDU having the first sequence number is to be skipped.

16. The electronic device of claim 15, wherein determining whether to re-transmit the RLC SDU comprises:
 determining a level of importance of the RLC SDU based on higher layer information associated with the RLC SDU; and
 determining whether to re-transmit the RLC SDU based on the determined level of importance of the RLC SDU.

17. The electronic device of claim 16, wherein the higher layer information associated with the RLC SDU is a type of IP packet from which the RLC SDU is derived.

18. The electronic device of claim 16, wherein the higher layer information associated with the RLC SDU is an importance value assigned, by an application, to an IP packet from which the RLC SDU is derived.

19. The electronic device of claim 16, wherein determining whether to re-transmit the RLC SDU based on the determined level of importance of the RLC SDU comprises:
 based on a determination that the level of importance does not satisfy a predetermined threshold, determining that the RLC SDU is not to be re-transmitted.

* * * * *